US011600480B2

(12) United States Patent
Nieto Ramos et al.

(10) Patent No.: US 11,600,480 B2
(45) Date of Patent: Mar. 7, 2023

(54) METHODS AND APPARATUS FOR ION TRANSFER BY ION BUNCHING

(71) Applicant: Thermo Finnigan LLC, San Jose, CA (US)

(72) Inventors: Pablo Nieto Ramos, Campbell, CA (US); Mikhail V. Ugarov, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 289 days.

(21) Appl. No.: 17/028,204

(22) Filed: Sep. 22, 2020

(65) Prior Publication Data
US 2022/0093381 A1    Mar. 24, 2022

(51) Int. Cl.
*H01J 49/00*      (2006.01)
*H01J 49/06*      (2006.01)
(Continued)

(52) U.S. Cl.
CPC .......... *H01J 49/063* (2013.01); *G01N 27/622* (2013.01); *H01J 49/0031* (2013.01); *H01J 49/066* (2013.01); *H01J 49/4225* (2013.01)

(58) Field of Classification Search
CPC .... H01J 49/004; H01J 49/005; H01J 49/0031; H01J 49/063; H01J 49/065; H01J 49/066;
(Continued)

(56) References Cited

U.S. PATENT DOCUMENTS

| 4,458,149 A | 7/1984 | Muga |
| 6,794,641 B2 | 9/2004 | Bateman et al. |

(Continued)

FOREIGN PATENT DOCUMENTS

| CN | 107342209 B | 6/2019 |
| EP | 1367632 A2 | 12/2003 |

(Continued)

OTHER PUBLICATIONS

Chudinov et al., "Study of the Dependence of Peptide Collision Cross Section on the Ion Bunch Drift Velocity in Nitrogen1", Journal of Analytical Chemistry, 2015, vol. 70, No. 14, pp. 1647-1653.

(Continued)

*Primary Examiner* — David E Smith
*Assistant Examiner* — Hsien C Tsai

(57) ABSTRACT

A mass spectrometry method comprises: receiving a stream of ions at an inlet end of an ion transport device; accumulating a first portion of the ion stream at a first electrical potential well at a first position within the ion transport device between the inlet and outlet ends; creating a generally descending potential profile within the ion transport apparatus between a second position and the outlet end and, simultaneously, creating a second potential well at a third position within the ion transport apparatus, the second position disposed between the first position and the inlet end, the third position disposed between the second position and the inlet end; and transporting the accumulated first portion of the ion stream from the first position to the outlet end under the impetus of the generally descending potential profile and, simultaneously, accumulating a second portion of the ion stream at the second potential well.

27 Claims, 10 Drawing Sheets

(51) Int. Cl.
*G01N 27/622* (2021.01)
*H01J 49/42* (2006.01)

(58) Field of Classification Search
CPC .. H01J 49/401; H01J 49/4235; H01J 49/4225; H01J 49/427; G01N 27/622; G01N 27/623
See application file for complete search history.

(56) References Cited

U.S. PATENT DOCUMENTS

| | | |
|---|---|---|
| 6,960,760 B2 | 11/2005 | Bateman et al. |
| 7,759,637 B2 | 7/2010 | Thomson |
| 7,781,728 B2 | 8/2010 | Senko et al. |
| 7,847,243 B2 | 12/2010 | Makarov et al. |
| 8,013,290 B2 | 9/2011 | Rather et al. |
| 8,604,419 B2 | 12/2013 | Nolting et al. |
| 8,841,608 B2 | 9/2014 | Shvartsburg et al. |
| 9,536,721 B2 | 1/2017 | Berdnikov et al. |
| 9,978,572 B2 | 5/2018 | Giles et al. |
| 10,236,168 B1 | 3/2019 | Kovtoun |
| 10,699,889 B2 * | 6/2020 | Slater ............ H01J 49/065 |
| 2016/0189946 A1 | 6/2016 | Nishiguchi et al. |
| 2019/0164737 A1 | 5/2019 | Gillig et al. |

FOREIGN PATENT DOCUMENTS

| | | |
|---|---|---|
| EP | 1943663 A2 | 7/2008 |
| EP | 2013895 B1 | 9/2018 |
| JP | 6680230 B2 | 8/2018 |
| WO | 2004/109741 A2 | 12/2004 |
| WO | 2020109091 A1 | 6/2020 |

OTHER PUBLICATIONS

Dutt, "Theory of "Ion-Bunching" in Relation to the Development of an Electrostatic Time-of-Flight Mass Spectrometer", Nuclear Instruments and Methods 10 (1961), pp. 37-44.

Ujma et al., "A New High Resolution Ion Mobility Mass Spectrometer Capable of Measurements of Collision Cross Sections from 150-520K", Analytical Chemistry, 2016, 88, pp. 9469-9478.

EP Examination and Search Report dated Feb. 16, 2022, to EP Patent Application No. 21198365.5.

* cited by examiner

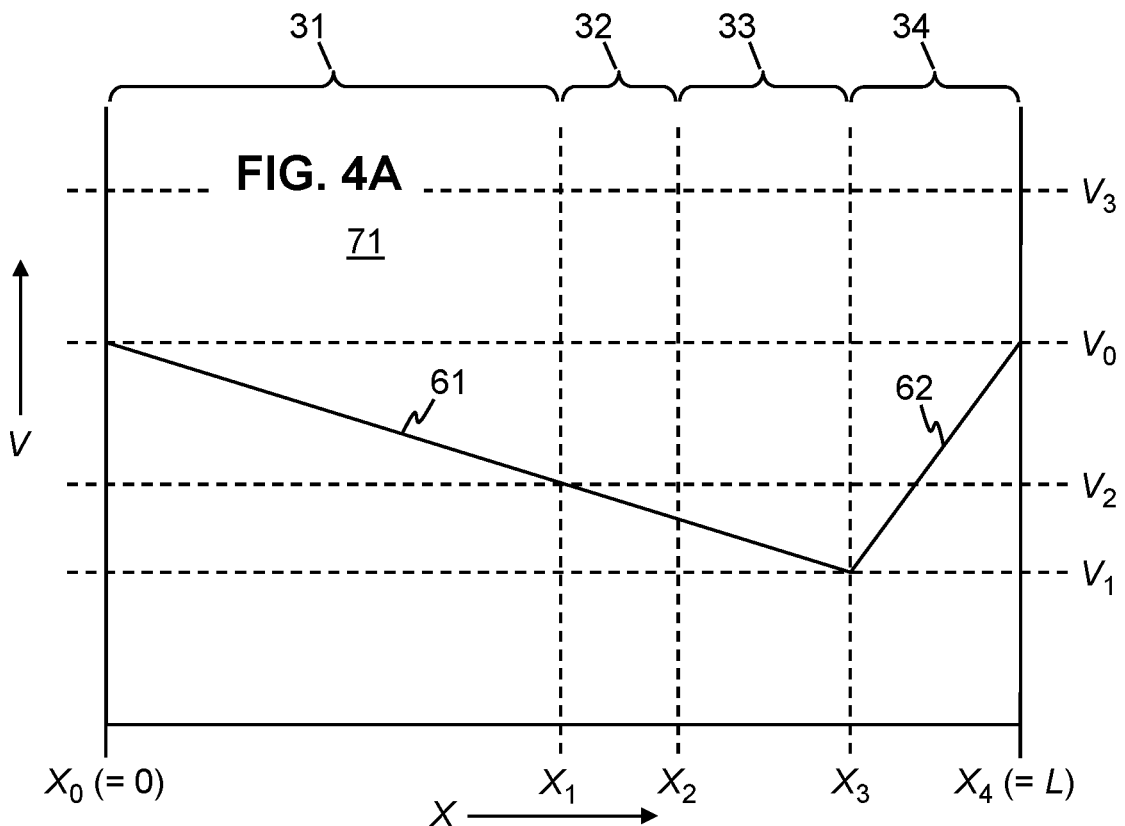
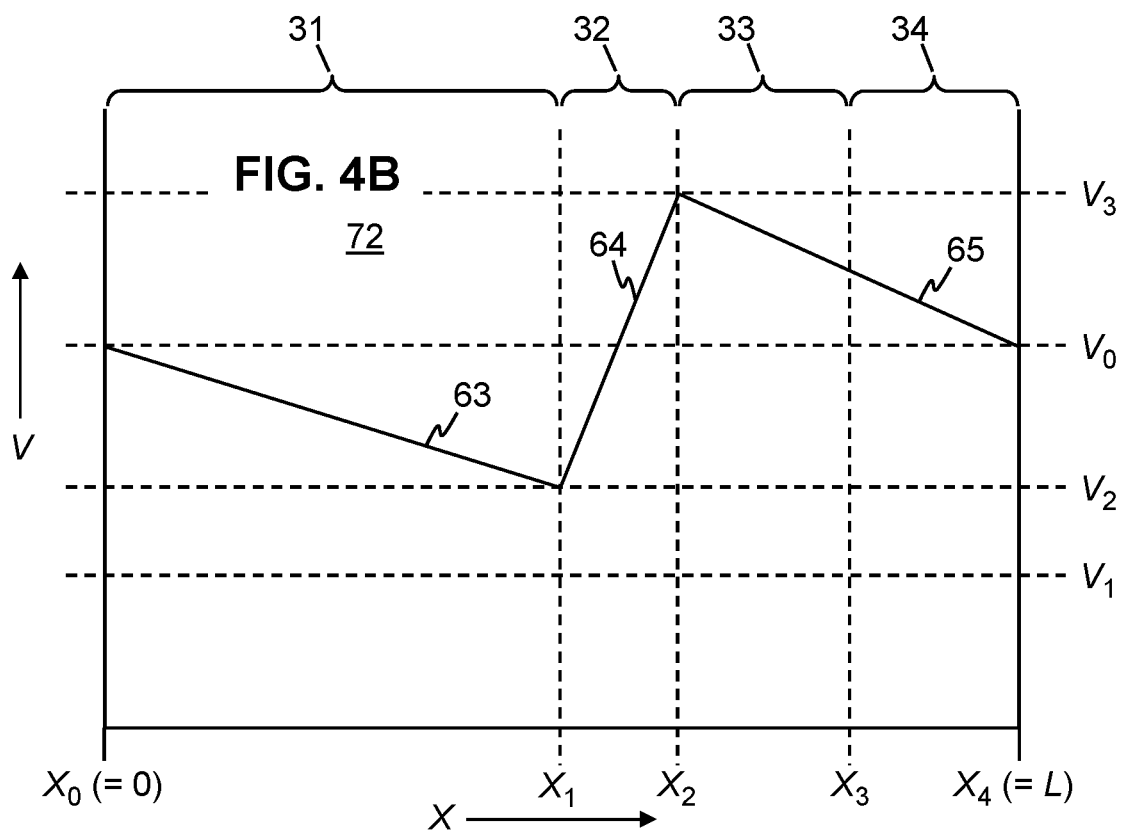

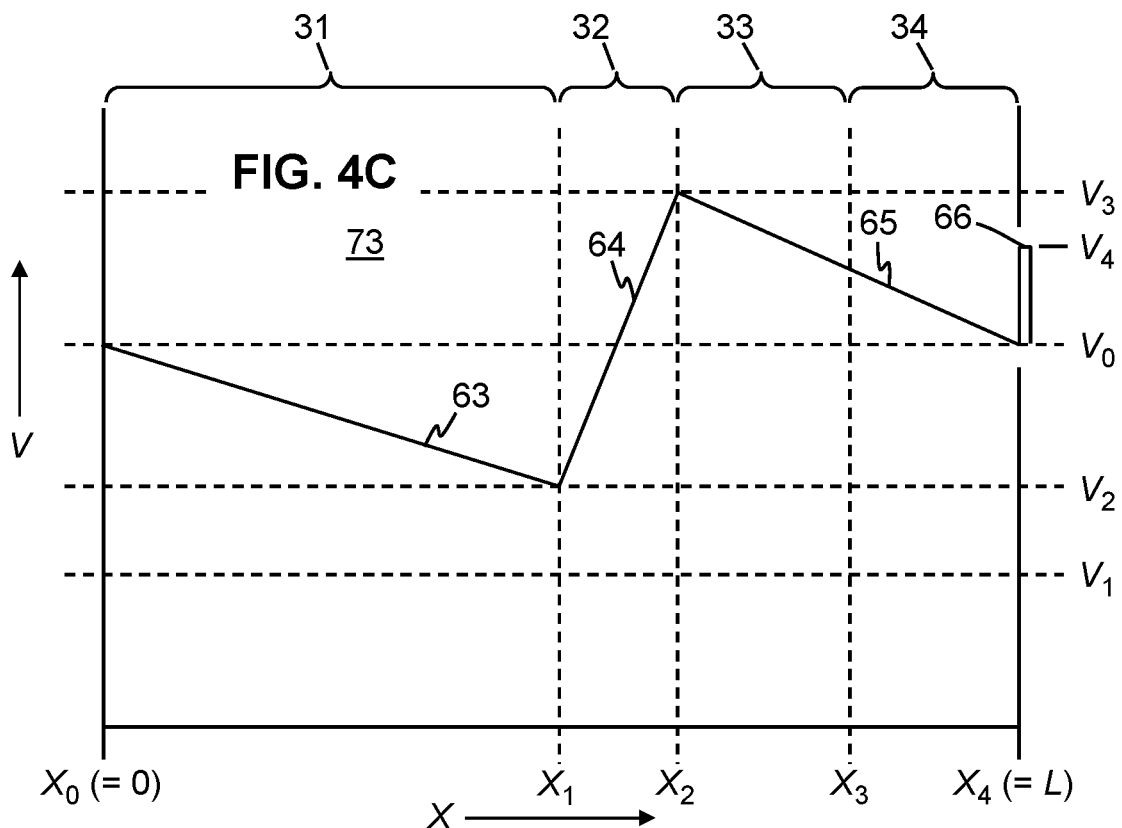
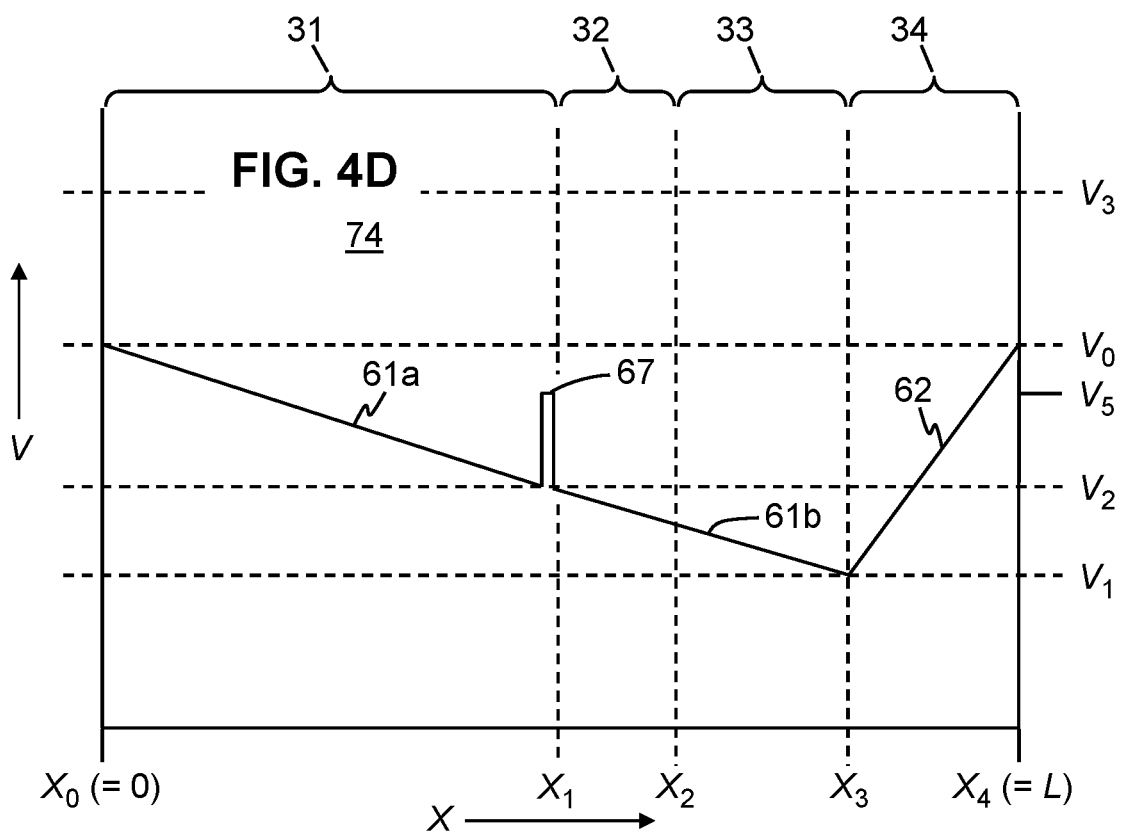

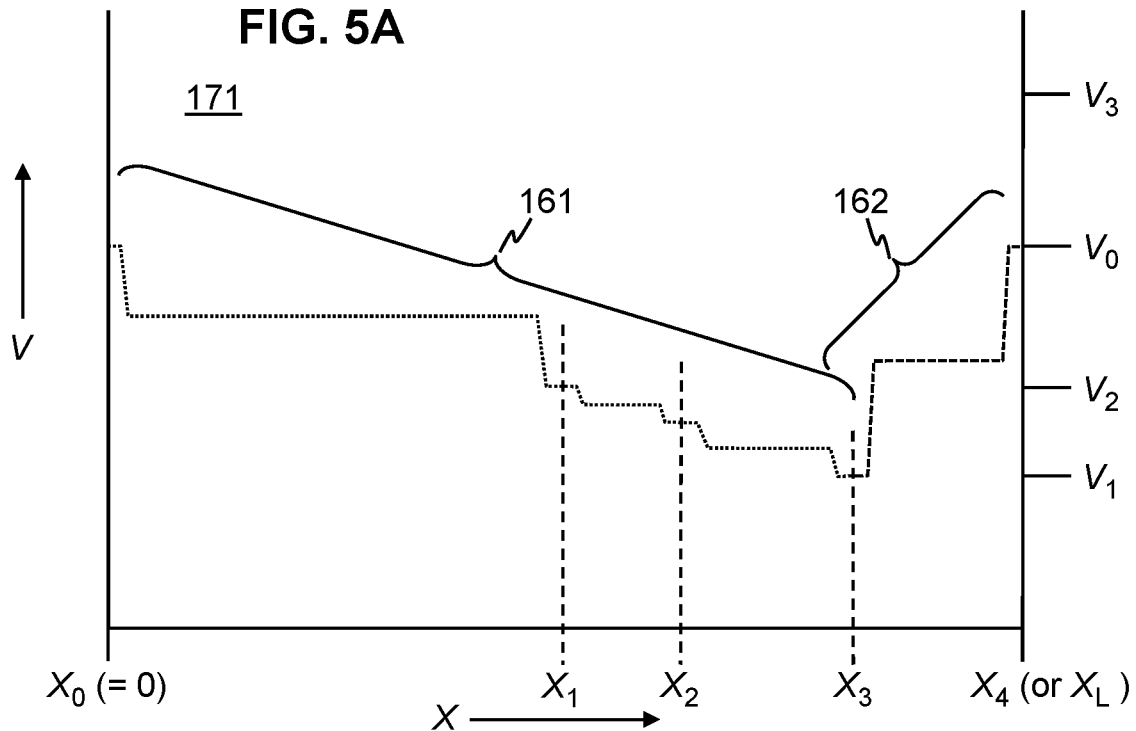
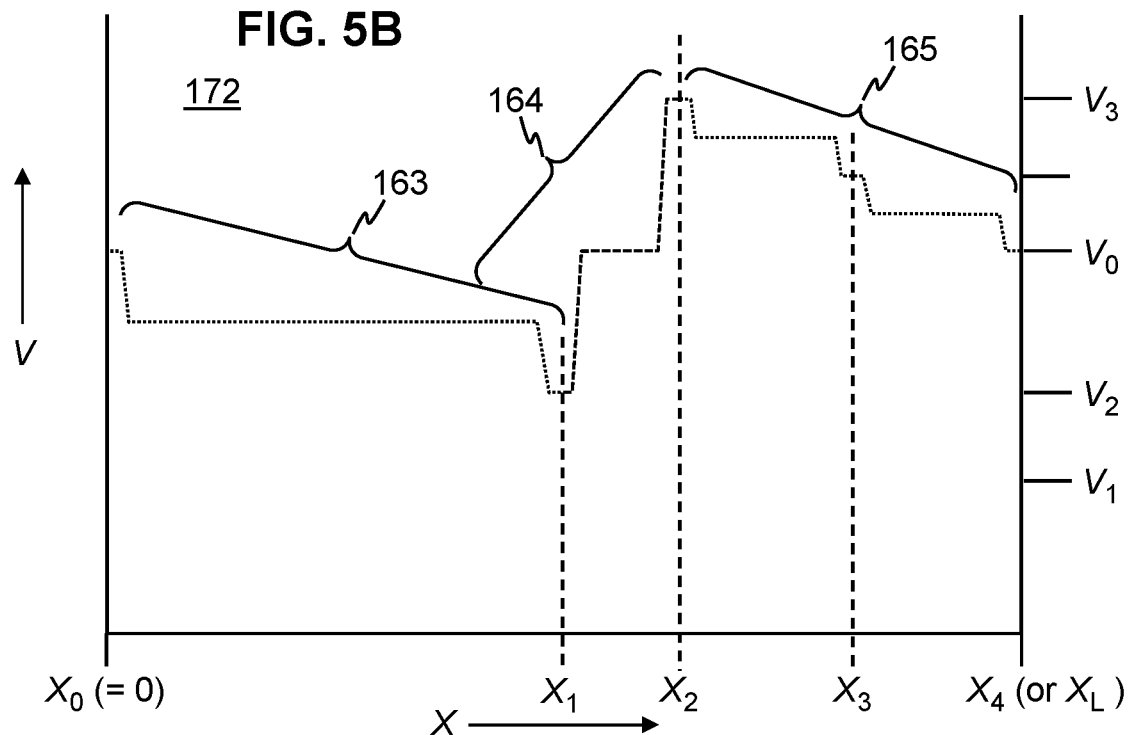

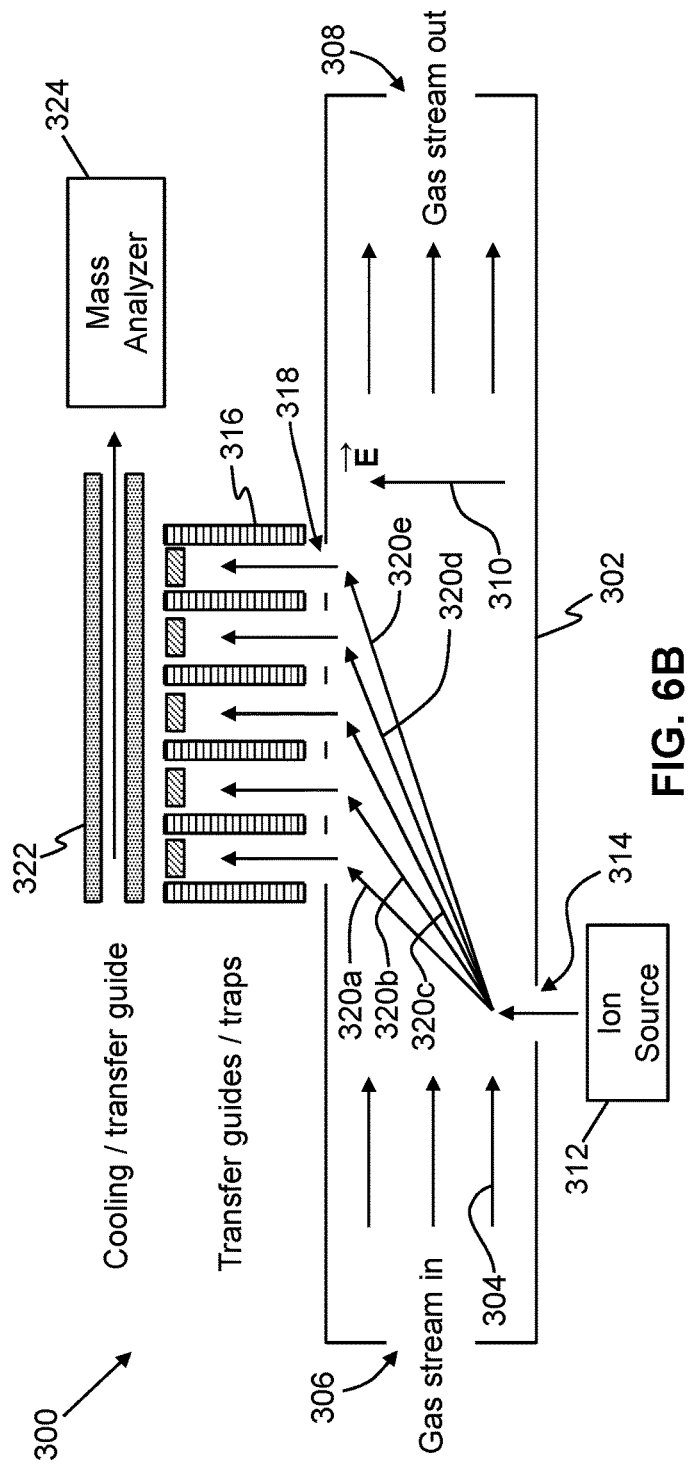
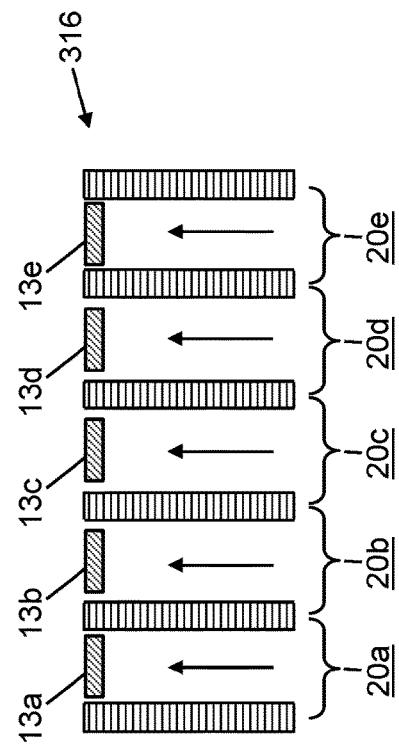
FIG. 6B
FIG. 6C

METHODS AND APPARATUS FOR ION TRANSFER BY ION BUNCHING

TECHNICAL FIELD

The present disclosure relates to mass spectrometry. More particularly, the present disclosure relates to transfer of ions in the presence of background gas within the pressure range of 1 mTorr up to several tens of Torr.

BACKGROUND

In mass spectrometry applications, it is often important to transport ions quickly and effectively through regions with background gas pressure within the pressure range of 1 mTorr up to several tens of Torr (e.g., 80 Torr). Since ion motion in these conditions is determined by the mobility in gas, to decrease ion drift time one must increase potential gradients along the beam path. If an ion path is substantially long, a large overall potential difference may be required. This may cause problems as some of the elements cannot be easily floated to high potential with respect to ground.

For example, Giles et al. explain, in U.S. Pat. No. 9,978,572, that the cumulative effect of multiple electrical potential steps between adjacent components of a mass spectrometer system may lead to unacceptably large voltages in upstream components in the presence of gas. This problem is schematically illustrated in a general sense in FIG. 1A, which pertains to a system configuration 100 of a mass spectrometer system that comprises a first upstream device 3, a second upstream device 4, a gas-filled collision cell 5 and a downstream device 6. The dotted line 8 represents the electrical breakdown limit. The position along the instrument of is depicted from left to right and the electric potential at that position is represented by the vertical axis. To induce fragmentation, a potential difference is introduced between the upstream devices 3, 4 and the collision cell 5 by raising the absolute potential applied to the upstream devices 3, 4. The electrical potential profile across the system is schematically illustrated by dotted line 101. The raised potential of the upstream devices cause ions emerging from the second upstream device 4 to be accelerated through the potential difference, denoted as "CE" in FIG. 1A, between the outlet of the second upstream device 4 and the entrance of the collision cell 5. The collision energy is primarily determined by this potential difference. However, the raised electrical potential may cause the voltage applied to the upstream devices 3, 4 and to be above the electrical breakdown limit 8. Although the discussion by Giles et al. specifically pertains to large potentials and potential gradients caused by the need to impart collision energy to ions, similar problems may occur when large potential gradients are applied in order to transport ions through regions with background pressure.

To avoid such complications, several solutions have been proposed. For example, Giles et al. teach, in the aforementioned U.S. Pat. No. 9,978,572, application of electrical potentials that generate a reverse axial DC electric field together with generation of a "traveling wave" that drives ions against the corresponding potential gradient. This approach is schematically illustrated in the presently accompanying FIGS. 1B and 1C. As depicted in the system configuration 1 shown in FIG. 1B, the potential difference (CE) required for collision induced dissociation may be introduced, at least in part, by applying a reverse axial DC electric field to the collision cell 5. The reverse axial electric field provides an increasing axial potential in the downstream direction so that the potential at the outlet of the collision cell 5 is raised relative to the potential at the entrance. The potential drop defining the collision energy is therefore localized to region around the entrance of the collision cell 5. To transmit ions from the collision cell 5 to a downstream device 6, it is necessary to drive ions against the reverse axial electric field. This effect can be achieved if the collision cell comprises a plurality of electrodes and/or is segmented in the axial direction so that independent transient DC potentials or voltage waveforms can be applied to each segment. The transient DC potentials or voltage waveforms applied to each segment generate a travelling wave 7 which moves in the axial direction and thereby urges or propels ions up or against the potential gradient of the reverse axial electric field. As an alternative, the required collision energy (CE) may be provided by generating a reverse axial DC electric field in the upstream component 4, as is schematically depicted in the system configuration 120 shown in FIG. 1C. In this case, the travelling wave is generated in the upstream component 4.

Alternative approaches to transporting ions through gas-containing regions of mass spectrometers include using gas flow as a "driving force" for ion transport. In practice, however, the implementation of either a travelling wave or a gas-flow transport regime are quite complicated to realize and may not be appropriate for all systems, either in terms of ion motion timing, technical feasibility or cost effectiveness.

SUMMARY

In accordance with the present teachings, the reduction of potential gradients can be achieved by breaking the continuity of ion flow. The ions of in incoming ion stream are bunched into individual spatially-separated packets to allow for temporary creation of regions, within an ion transport apparatus, of reverse gradient where no ions are present. In this way, regions within the ion transport apparatus that are between packets can be temporarily elevated to a potential similar to that of the ion inlet of the ion transport apparatus, thus allowing forward migration of the individual packets of ions while reducing the overall gradient across the ion transport apparatus and throughout the instrument.

Accordingly, in a first aspect of the present teachings, a mass spectrometer system is provided, the mass spectrometer system comprising:
  an ion source;
    a mass analyzer;
    an ion transport apparatus disposed between the ion source and the mass analyzer comprising:
      an ion inlet having an inlet electrode thereat and disposed at a longitudinal position $X_0$;
      an ion outlet having an outlet electrode thereat and disposed at a longitudinal position, $X_L$; and
      a plurality of ring or plate electrodes disposed between the inlet and outlet electrodes;
    one or more power supplies electrically coupled to the inlet and outlet electrodes and to the plurality of ring or plate electrodes; and
    a computer or electronic controller electrically coupled to the one or more power supplies and comprising computer-readable instructions operable to cause the one or more power supplies to:
      supply an oscillatory radio-frequency (RF) voltage to each electrode of the plurality of ring or plate electrodes, wherein an RF phase supplied to each electrode is π radians out of phase relative an RF phase supplied to each adjacent electrode; and repeatedly performing the steps of:
(a) providing a first respective direct-current (DC) voltage to each of the plurality of ring or plate electrodes, the plurality of first DC voltages defining a first electrical potential profile that defines an ion-trapping potential well at a longitudinal position $X_k$, where $X_0 < X_i \ll X_L$; and
(b) providing a second respective DC voltage to each of the plurality of ring or plate electrodes, the plurality of second DC voltages defining a second electrical potential profile that establishes an axial field at position $X_k$ that is directed to urge ions towards the outlet electrode, the plurality of second DC voltages further defining a trapping potential well at a longitudinal position $X_i$, where $X_0 < X_i < X_k$.

According to a second aspect of the present teachings, there is provided a second mass spectrometer system comprising:
an ion source;
a mass analyzer;
an ion transport apparatus disposed between the ion source and the mass analyzer comprising:
  an ion inlet having an inlet electrode thereat and disposed at a longitudinal position $X_0$;
  an ion outlet having an outlet electrode thereat and disposed at a longitudinal position, $X_L$; and
  a plurality of multipole segments disposed between the inlet and outlet electrodes, each multipole segment comprising a respective plurality of mutually parallel rod electrodes;
one or more power supplies electrically coupled to the inlet and outlet electrodes and to the plurality of rod electrodes of each multipole segment; and
a computer or electronic controller electrically coupled to the one or more power supplies and comprising computer-readable instructions operable to cause the one or more power supplies to:
  supply an oscillatory radio-frequency (RF) voltage to each rod electrode of each multipole segment, wherein, within each multipole segment, an RF phase supplied to each rod electrode of said segment is π radians out of phase relative an RF phase supplied to each adjacent rod electrode of said segment; and
  repeatedly performing the steps of:
    (a) providing a first respective direct-current (DC) voltage to all of the rod electrodes of each of the plurality of multipole segments, the plurality of first DC voltages defining a first electrical potential profile that defines an ion-trapping potential well at a longitudinal position $X_k$, where $X_0 < X_k < X_L$; and
    (b) providing a second respective DC voltage to all of the rod electrodes of each of the plurality of multipole segments, the plurality of second DC voltages defining a second electrical potential profile that establishes an axial field at position $X_k$ that is directed to urge ions towards the outlet electrode, the plurality of second DC voltages further defining a trapping potential well at a longitudinal position $X_i$, where $X_0 < X_i < X_k$.

According to a third aspect of the present teachings, there is provided a method of transporting ions in a mass spectrometer, the method comprising:

receiving a continuous stream of positively charged ions at an inlet end of an ion transport device, the ion transport device further comprising an outlet end;

accumulating a first portion of the stream of ions at a first electrical potential well at a first position within the ion transport device between the inlet end and the outlet end, the accumulating driven by an electrical potential difference between the first position and the inlet end;

creating a generally descending potential profile within the ion transport apparatus between a second position and the outlet end and, simultaneously, creating a second potential well at a third position within the ion transport apparatus, the second position disposed between the first position and the inlet end, the third position disposed between the second position and the inlet end; and transporting the accumulated first portion of the ion stream from the first position to the outlet end under the impetus of the generally descending potential profile and, simultaneously, accumulating a second portion of the ion stream at the second potential well, the accumulation of the second portion of the ion stream driven by an electrical potential difference between the third position and the inlet end.

According to a fourth aspect of the present teachings, there is provided a system for analyzing a sample comprising:
an ion source configured to generate ions from constituent components of the sample;
a mobility separator configured to separate ions received from the ion source based on their respective mobility in a gas, the mobility separator providing a gas flow in a first direction and an electric field gradient along a second direction such that ions move in the first direction and drift according to their mobility in the second direction such that the ions are sorted based on their respective mobility;
a plurality of ion transport apparatuses arranged adjacent to the mobility separator such that ions from the mobility separator are directed to different ion transport apparatuses according to their respective mobility, each ion transport apparatus comprising:
  an outlet ion gate operable to either release ions from the ion transport apparatus through an outlet of the ion transport apparatus or to prevent ions from being released from the ion transport apparatus through its ion outlet;
a mass analyzer configured to receive ions from the ion outlet of each ion transport apparatus; and
one or more power supplies electrically coupled to the mobility separator and the plurality of ion transport apparatuses.

In various embodiments, the system for analyzing the sample may further comprise a computer or electronic controller electrically coupled to the one or more power supplies and comprising computer-readable instructions operable to cause the one or more power supplies to operate the plurality of outlet gates such that ions are released from no more than one of the outlet gates at any one time. In various embodiments, the system for analyzing the sample may further comprise a computer or electronic controller electrically coupled to the one or more power supplies and comprising computer-readable instructions operable to cause the one or more power supplies to operate the plurality of outlet gates such that ions received from the mobility separator are accumulated in each ion transport apparatus for a respective accumulation time duration, wherein the plurality of accumulation time durations are not all identical.

BRIEF DESCRIPTION OF THE DRAWINGS

The above noted and various other aspects of the present invention will become apparent from the following description which is given by way of example only and with reference to the accompanying drawings, not necessarily drawn to scale, in which:

FIG. 4A is a schematic depiction of a first example potential profile that may be applied across the length of an ion transfer apparatus during a phase of operation of the apparatus in accordance with the present teachings;

FIG. 4B is a schematic depiction of an example potential profile that may be applied across the length of an ion transfer apparatus during a different phase of operation of the apparatus in accordance with the present teachings;

FIG. 4C is a schematic depiction of an example potential profile that may be applied across the length of an ion transfer apparatus during a still different phase of operation of the apparatus in accordance with some embodiments of the present teachings;

FIG. 4D is a schematic depiction of an example potential profile that may be applied across the length of an ion transfer apparatus during a yet further different phase of operation of the apparatus in accordance with some embodiments of the present teachings;

FIG. 5A is a schematic depiction of an example potential profile that may be applied across the length of another ion transfer apparatus during a phase of operation of that apparatus in accordance with the present teachings;

FIG. 5B is a schematic depiction of an example potential profile that may be applied across the length of the ion transfer apparatus referred to by FIG. 5A during a different phase of operation of that apparatus in accordance with the present teachings;

FIG. 6B is a schematic depiction of a second mass spectrometer system, in accordance with the present teachings, that includes an ion mobility separation device and an array of ion transfer apparatuses in accordance with the present teachings; and FIG. 6C is an enlarged portion of the array of ion transfer apparatuses of FIG. 6B.

DETAILED DESCRIPTION

Figure 1A:
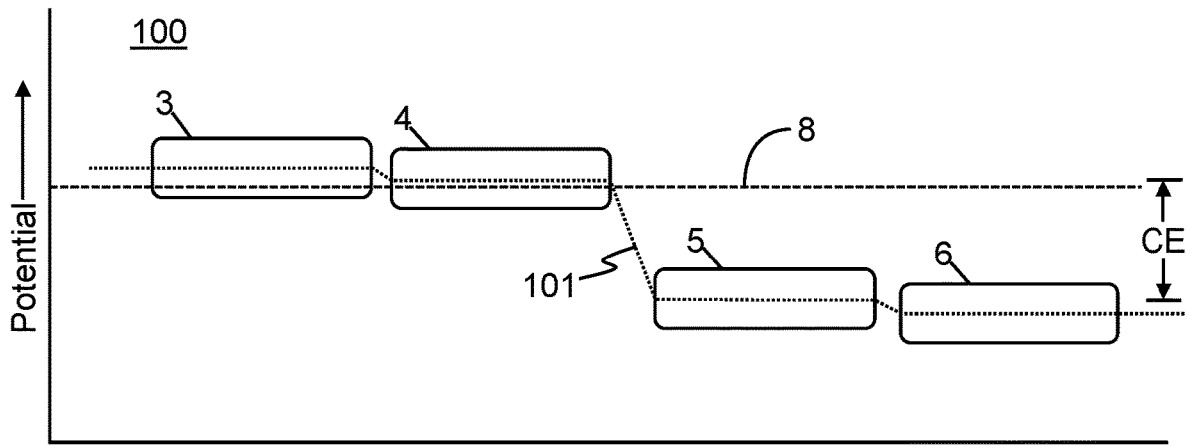
FIG. 1A is a schematic depiction of electrical potentials applied to components of a mass spectrometer during collision-induced dissociation according to a well-known conventional approach.
Figure 1B:
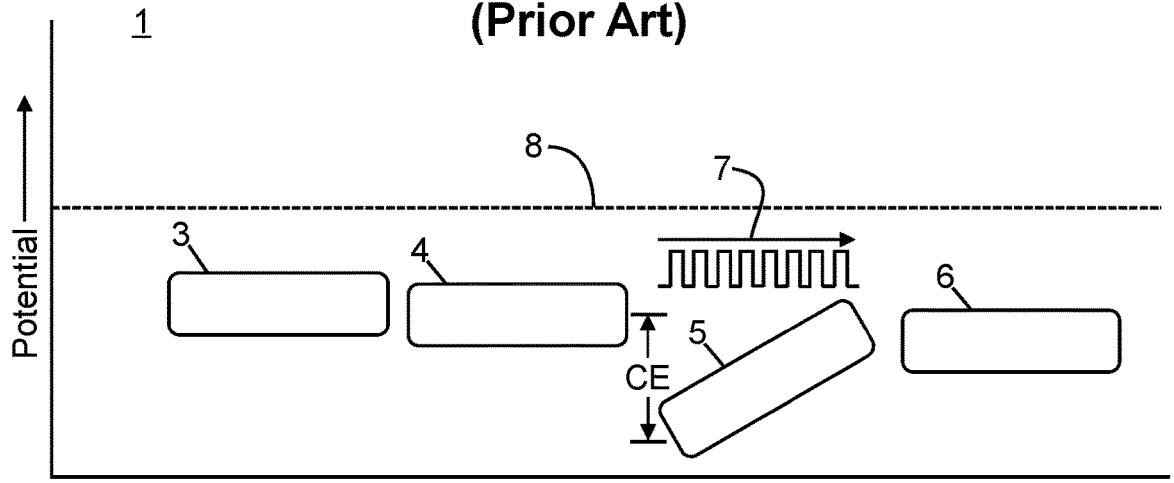
FIG. 1B is a schematic depiction of applied potentials during collision-induced dissociation according to a known method for transferring ions through a mass spectrometer.
Figure 1C:
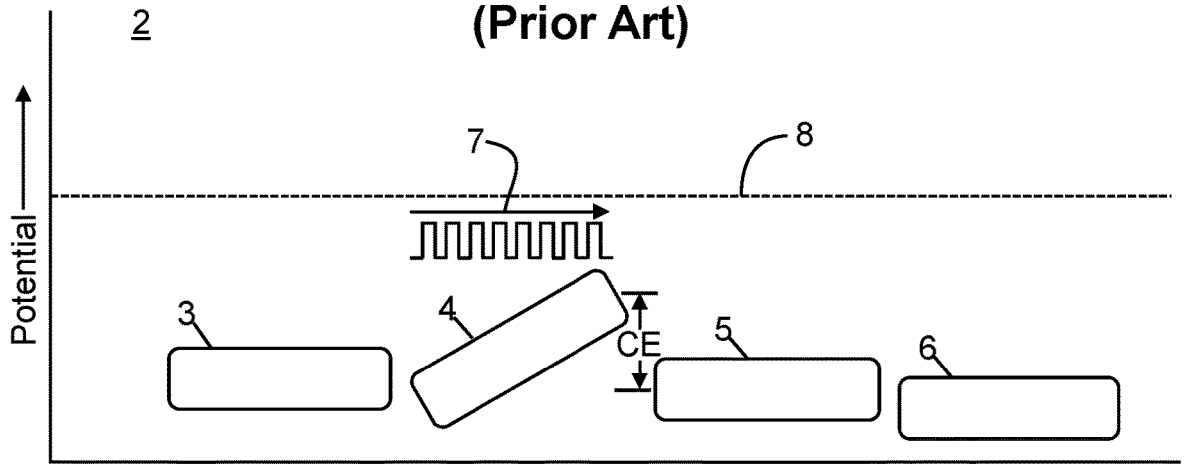
FIG. 1C is a schematic depiction of applied potentials during collision-induced dissociation according to a known alternative known method for transferring ions through a mass spectrometer.

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features and advantages of the present invention in greater detail, please refer to the accompanying FIGS. 1A-1B; 2A-2D-3A-3B, 4A-4D, 5A-5B and 6A-6C, in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that, for any given component or embodiment described herein, any of the possible candidates or alternatives listed for that component may generally be used individually or in combination with one another, unless implicitly or explicitly understood or stated otherwise. It will be understood that any list of candidates or alternatives is merely illustrative, not limiting, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements.

As used herein, the term "DC", when referring to a voltage applied to one or more electrodes of a mass spectrometer component (such as an ion funnel), does not necessarily imply the imposition of or the existence of an electrical current through those electrodes but is used only to indicate that the referred-to applied voltage either is static or, if non-static, is non-oscillatory and non-periodic. The term "DC" is thus used herein to distinguish the referred-to voltage(s) from applied periodic oscillatory voltages, which themselves may be referred to as either "RF" or "AC" voltages.

Figure 2A:
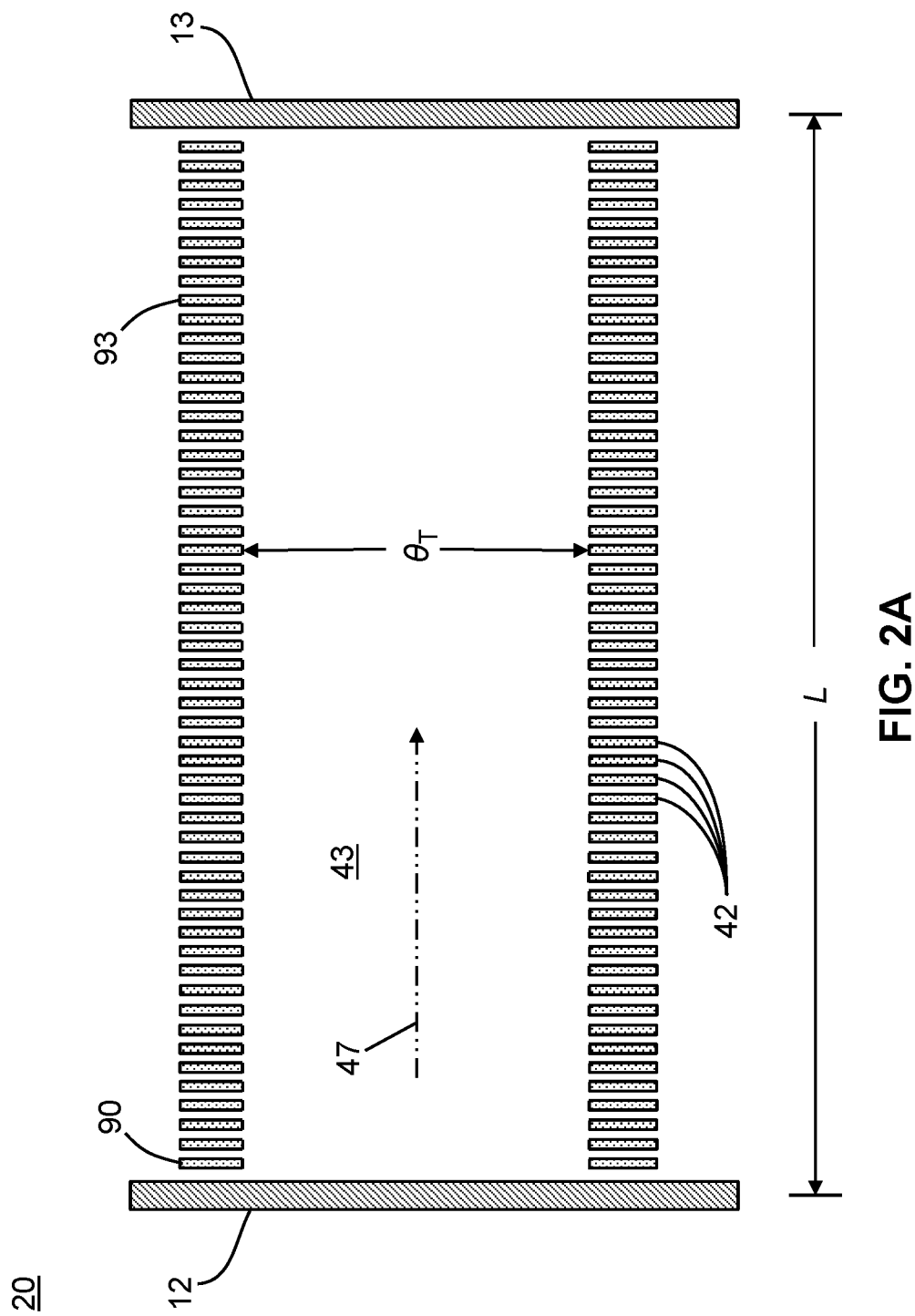
FIG. 2A is a schematic depiction of a stacked ring ion guide, in the form of an ion tunnel, upon which methods in accordance with the present teachings may be practiced.

FIG. 2A is a schematic depiction of a known ion transport apparatus 20 on which methods in accordance with the present teachings may be practiced. As shown in FIG. 2A, the ion transport apparatus 20 comprises a stacked ring ion guide in the form of an ion tunnel. Generally described, the ion tunnel apparatus 20 comprises a plurality of closely longitudinally spaced ring or plate electrodes or ring electrodes 42 that have apertures of essentially constant diameter, $\theta_T$, that define an internal hollow volume 43 within which ions are constrained by electrostatic forces. Preferably, the diameter, $\theta_T$, is within the range of 4-10 mm, inclusive. The set of ring or plate electrodes 42 may be disposed between inlet electrode 12 and an outlet electrode 13, either one or both of which may comprise an ion lens or an ion gate that focuses the ion stream and/or controls the timing of admission of the ion stream into the apparatus.

According to a well-known mode of operation of the apparatus 20, a Radio-Frequency (RF) voltage waveform of constant amplitude is applied to all of the ring or plate electrodes 42 with every second electrode receiving a first RF phase and all the remaining electrodes receiving a second RF phase that is exactly out of phase (i.e., a phase difference of π radians) with the first RF phase. Under such operation, pseudopotentials between adjacent plate or ring electrodes confine ions to the vicinity of a central longitudinal axis 47. Forward motion of the ions, in a general direction from the ion inlet electrode 12 to the ion outlet electrode 13, is driven, according to many modes of operation, by a flow of an inert background gas, such as nitrogen or helium. However, in accordance with the present teachings, ions are primarily urged in the forward direction by application of an axially directed electric field, sometimes referred to as a drag field, as described further below.

Figure 2B:
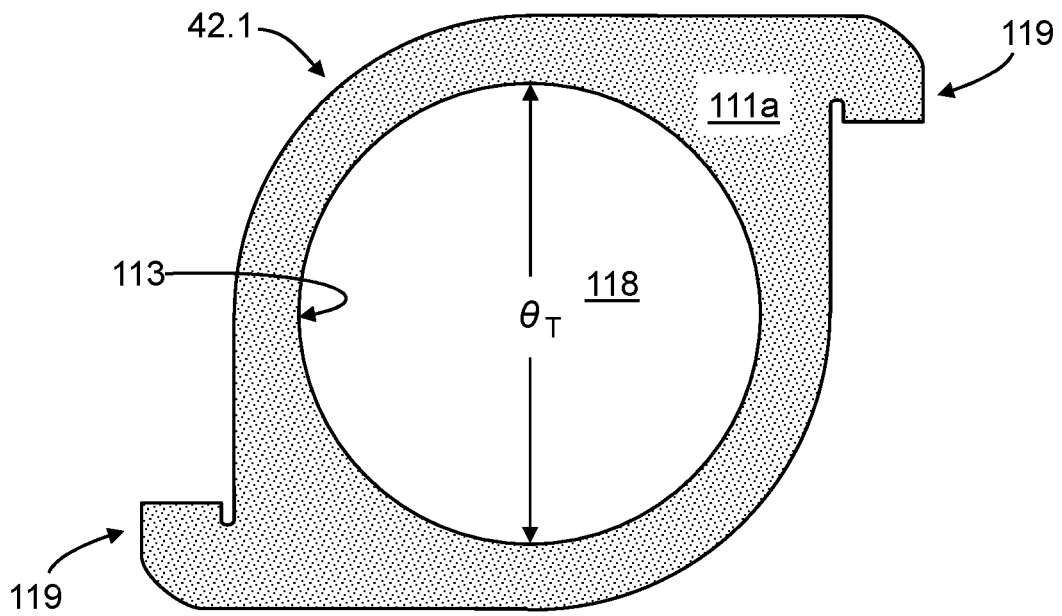
FIG. 2B is a schematic depiction of a first exemplary ring or plate electrode.
Figure 2C:
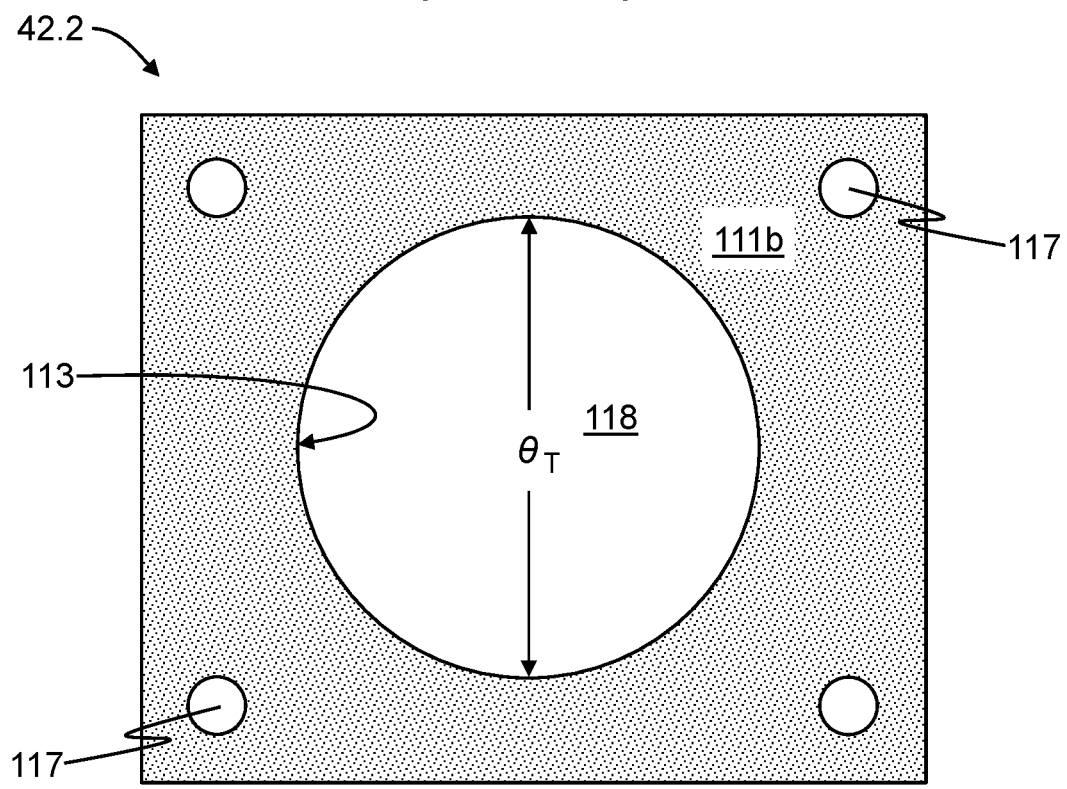
FIG. 2C is a schematic depiction of a second exemplary ring or plate electrode.

FIGS. 2B and 2C are schematic depictions of exemplary individual ring or plate electrodes 42.1, 42.2 of different forms, as viewed towards their faces. Each electrode comprises a material body 111a, 111b or either ring or plate form having an aperture 118 defined by an aperture surface 113 of preferably circular form. The electrode body 111a, 111b may comprise a crotchet or tab 119 that mates with a receptacle slot of a positioning holder, frame or railing (not shown) for the purpose of maintaining mutual alignment of a plurality of such electrodes (such as in the ion tunnel apparatus 20 of FIG. 2A or the ion funnel apparatus 120 of FIG. 2D). Alternatively, the electrode body may have mounting holes 117 through which fasteners may be inserted in order to mount the electrode to a frame. The electrode body 111a, 111b may be electrically coupled to a power supply by means of the crotchet, tab or fasteners. Alternatively, separate electrical leads (not shown) may provide the electrical coupling.

Figure 2D:
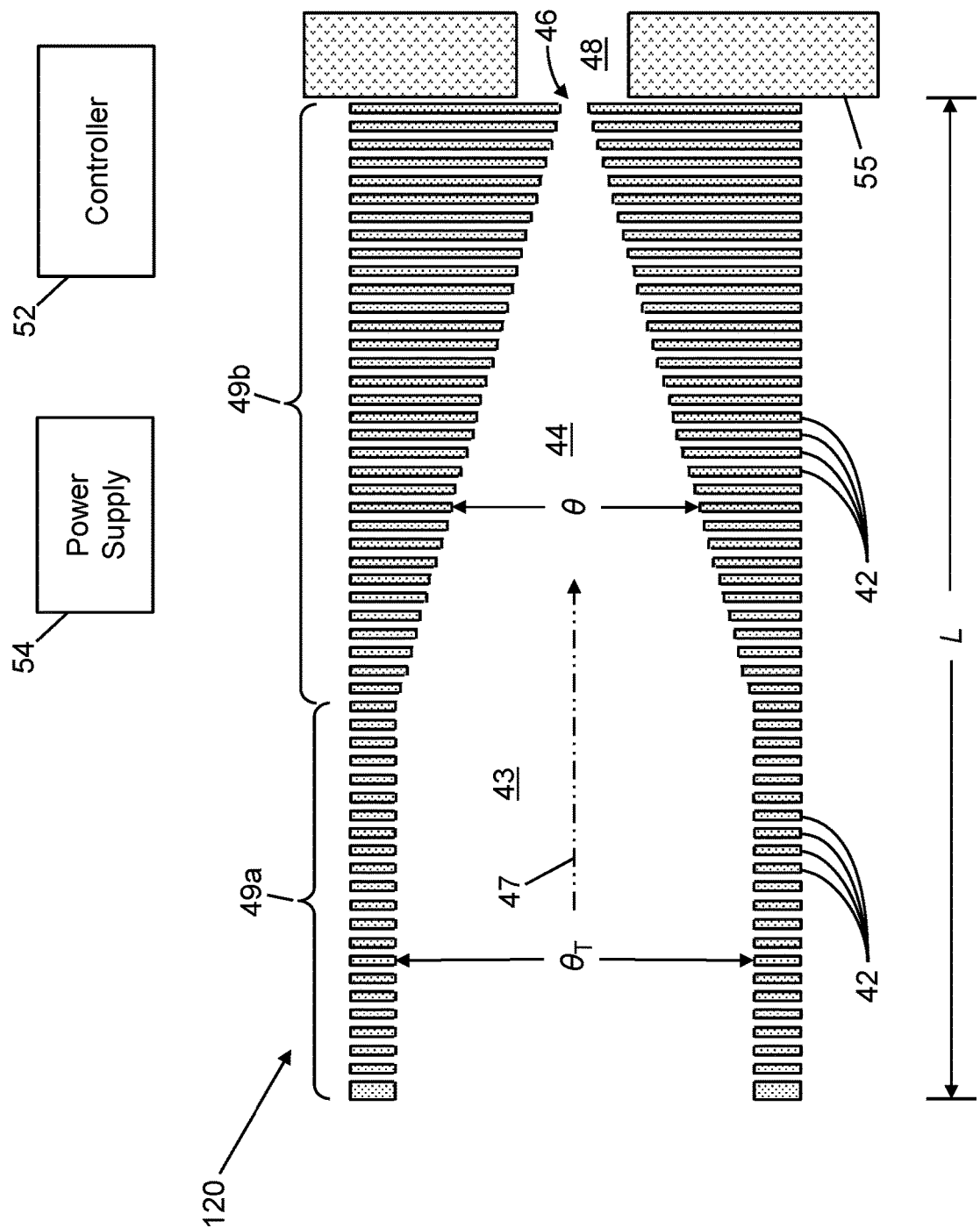
FIG. 2D is a schematic depiction of a stacked ring ion guide, in the form of an ion tunnel and an ion funnel, upon which methods in accordance with the present teachings may be practiced.

FIG. 2D is a schematic depiction of another known ion transport apparatus 120 on which methods in accordance with the present teachings may be practiced. As shown in FIG. 2D, the ion transport apparatus 120 comprises an ion funnel apparatus as taught in U.S. Pat. No. 9,761,427. Like the ion tunnel apparatus 20, the ion funnel apparatus 120 comprises a plurality of closely longitudinally spaced plate electrodes or ring electrodes 42 that have apertures that define an internal hollow volume. However, unlike the apparatus 20, the ion funnel apparatus 120 further includes an ion funnel portion 44 of the internal volume in addition to the ion tunnel portion 43 of the internal volume. The ion tunnel portion 43 of the internal volume corresponds to a first set 49a of the ring or plate electrodes having a common, constant aperture diameter, $\theta_T$. The ion funnel portion of the internal volume corresponds to a second set 49b of the electrodes that comprise apertures of variable diameter θ, which progressively decrease along the length of the funnel portion 44 with increasing proximity to an ion outlet aperture 46 of the apparatus. The second set 49b of electrodes focus the ions into a narrow beam that passes through the funnel ion outlet aperture 46 and into an adjoining mass spectrometer chamber through an aperture 48 in an interchamber partition 55.

Figure 3A:
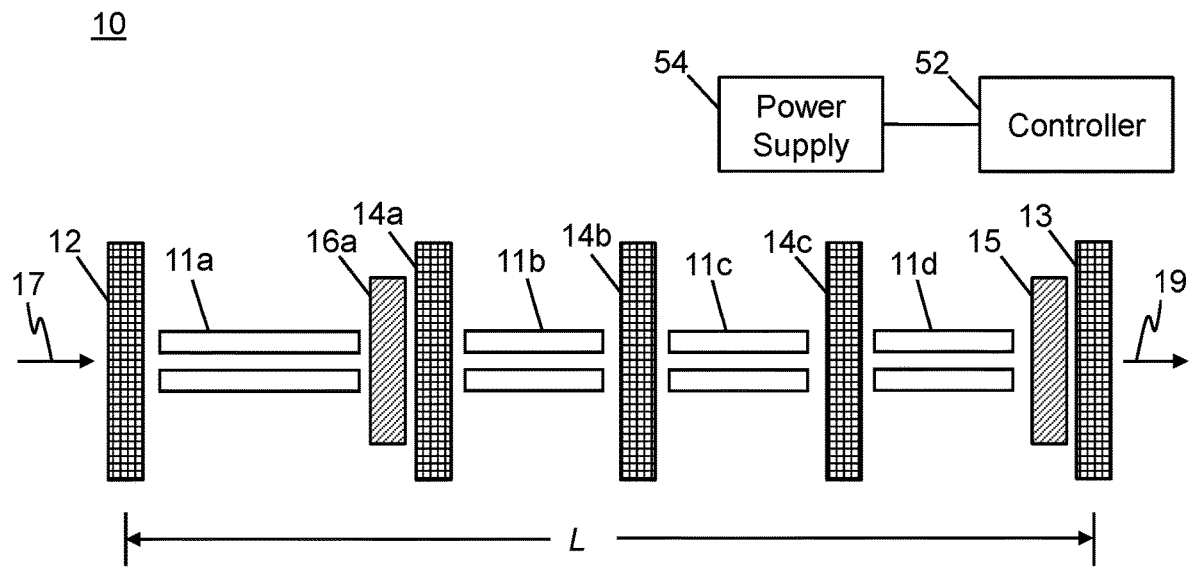
FIG. 3A is a schematic depiction of another exemplary ion transport apparatus on which methods in accordance with the present teachings may be practiced.

FIG. 3A is a schematic depiction of another ion transport apparatus upon which methods in accordance with the present teachings may be practiced. The ion transport apparatus 10 is either a segmented multipole device or a multiple multipole device comprising an inlet electrode 12, an outlet electrode 13, a plurality of multipole sections (e.g., "multipole segments") 11a, 11b, 11c, 11c, 11d and a plurality of electrical-potential-profile control electrodes 14a, 14b, 14c, each of which is disposed between two of the multipole segments. In known fashion, each multipole segment comprises a plurality of mutually parallel rod electrodes.

The apparatus 10 may further comprise gate electrodes at various locations between the inlet and outlet electrodes. One such gate electrode—specifically, an outlet gate electrode 15—may be disposed adjacent to the outlet electrode 13. One or more additional gate electrodes may be disposed between pairs of multipoles or multipole segments. For example, as shown in FIG. 3A, one gate electrode 16a may be disposed adjacent to the first electrical-potential-profile control electrode 14a and between mutipole segments 11a, 11b. One or more power supplies 54 are electrically coupled to the multipole rods, to the inlet and outlet electrodes, to the electrical-potential-profile control electrodes and to the gate electrodes. The one or more power supplies 54 are configured to provide oscillatory radio frequency (RF) voltages to the multipole rods of the multipole segments 11a-11d, with the RF phase of the voltage applied to each rod being exactly out-of-phase (i.e., a phase difference of π radians) with the RF phase of the voltage applied to each adjacent rod, in known fashion. As schematically illustrated in FIG. 3A, the one or more power supplies 54 may also be configured to provide non-oscillatory DC offset voltages to the other electrodes 12, 14a-14c, and 13 as well as to the rod electrodes of the multipole segments 11a-11d. In the latter case, a same DC offset potential is applied to all the rods of each multipole segment. The non-oscillatory DC offset potentials applied to the rod electrodes are superimposed on the applied oscillatory RF potentials.

The timing of the application of the various voltages is controlled by a computer or other digital logic controller 52 that is electrically coupled to the one or more power supplies 54. The computer or other digital logic controller 52 comprises computer-readable instructions, either in firmware or in software (or both) and either in permanent memory or and/or in transient memory, as retrieved from an information storage device, such as a floppy or hard disk, a flash storage device, etc. that is either remote of local. Under control of the computer-readable instructions, the computer or other digital logic controller 52 sends control signals to the one or more power supplies 54 that cause the one or more power supplies to supply a controlled sequence of controlled voltages to electrodes of the apparatus 10 that cause the apparatus to operate in accordance with the present teachings, as described below.

In operation, a stream of ions 17 is inlet to the apparatus 10, through the inlet electrode 12. The inlet electrode 12 may comprise an ion lens or an ion gate that focuses the ion stream and/or controls the timing of admission of the ion stream into the apparatus. After passing through the inlet electrode 12, the ions are radially confined, within each quadrupole segment, by the action of the RF voltages applied to the rod electrodes of the segment. Within the apparatus, radial confinement of ions is maintained by the pseudopotentials created by the application of the RF voltages to the rod electrodes of the multipole segments 11a-11d. Forward movement of ions through the apparatus is mostly driven by application of DC offset potential differences, as depicted in FIG. 3A, between each multipole segment and its adjacent electrode(s). Eventually, through operation of the apparatus 10 as described further below, the ions of the original ion stream are bunched into spatially-isolated discrete ion packets 19 that are outlet from the outlet end of the apparatus. In the absence of axial-field-creating electrode structures within the multipole segments, the potential profile segment within each multipole segment is essentially flat (e.g., FIG. 3A) and continued forward movement of ions within the multipole segment is dependent on the kinetic energy of ions introduced into the segment. Alternatively, axial-field-creating electrode structures may be incorporated into some or all of the multipole segments as discussed below.

Figure 3B:
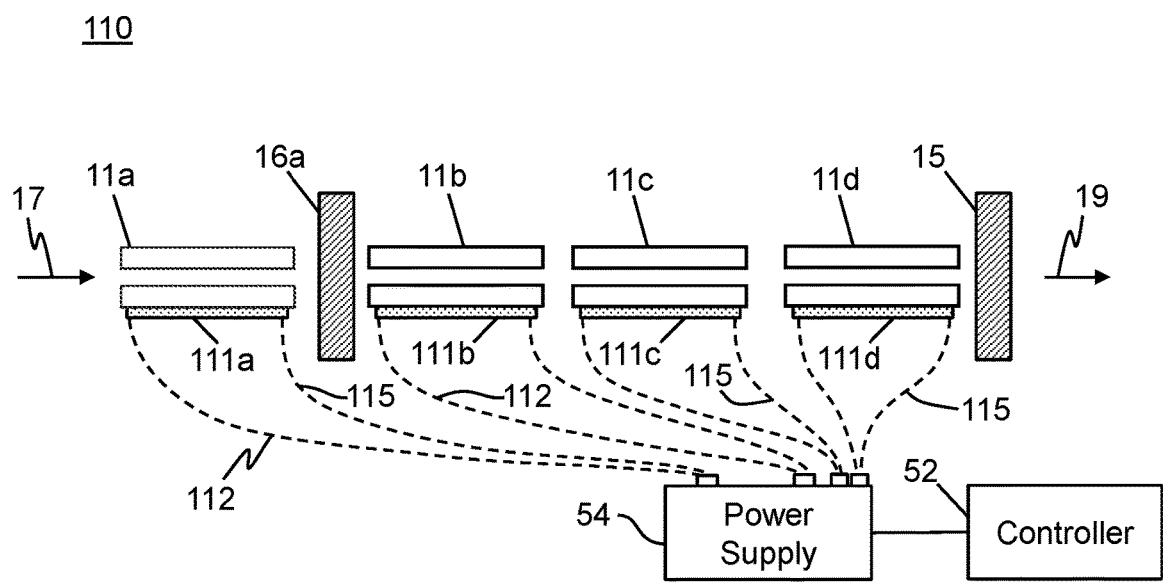
FIG. 3B is a schematic depiction of still another exemplary ion transport apparatus on which methods in accordance with the present teachings may be practiced.

FIG. 3B is a schematic depiction of still another exemplary ion transport apparatus 110 on which methods in accordance with the present teachings may be practiced. In similarity to the apparatus 10 (FIG. 3A), the apparatus 110 (FIG. 3B) comprises a plurality of multipole segments. Although four such multipole segments 11a-11d are depicted in FIG. 3B, the total number of such multipole segments is not limited or constrained to any particular value. The apparatus 110 of FIG. 3B differs from the apparatus 10 of FIG. 3A in that one or more of the electrical-potential-profile control electrodes 14a, 14b, 14c, of the apparatus 10 are removed, from the apparatus 110. Instead of employing profile control electrodes 14a, 14b, 14c to control the flow of ions, the apparatus 110 employs a plurality of axial-field-generating structures 111a-111d for this purpose. Each of the axial-field-generating structures 111a-111d is associated with a respective multipole segment. Although four such axial-field-generating structures are depicted in in FIG. 3B, the apparatus 110 may include an axial-field generating structure in conjunction with each of its multipole segments.

Generally, each axial-field generating structure generates an axially-directed electric field along the central axis of each multipole segment that urges ions within the multipole to move parallel to the axis in the general direction toward the outlet gate electrode 15. Many types of axial-field generating structures are known in the art. Many such axial-field generating structures, such as the axial-field-generating structures 111a-111d depicted in FIG. 3B, are electrically coupled to a first electrical lead 112 disposed at an upstream end of the multipole segment and a second electrical lead 115 disposed at a downstream end of the multipole segment, the two electrical leads being electrically coupled to a power supply 54. To generate an axial field, a voltage difference provided between the two leads is then divided or proportioned, either incrementally or continuously, along the length of the axial-field-generating structure. For example, commonly assigned U.S. Pat. No. 7,675,031, teaches the use of a set of auxiliary rod electrodes for creating drag fields. The auxiliary electrodes may be provided as arrays of finger electrodes that are disposed between rod electrodes of each multipole segment. As another example, U.S. Pat. No. 5,847,386 teaches the use of a set of auxiliary rod electrodes that are mounted parallel to one another and to the RF-carrying multipole rods in the spaces between the multipole rods. Each of the auxiliary rods has an insulating core with a surface layer of resistive material. A voltage applied between the two ends of each auxiliary rod establishes a potential gradient from one end to another. Alternative methods for generating an axial field within a multipole device include using tapered multipole rod electrodes, using non-parallel multipole rod electrodes (both methods taught in U.S. Pat. No. 5,847,386) as well as other techniques.

For simplicity, the following discussion of ion transport using controlled electrical potential profiles (FIGS. 4A-4D and 5A-5B) specifically pertain to the ion transport apparatus 10 (FIG. 3A) as but one example. However, one of ordinary skill in the art will readily understand how to apply the general principles of ion transport, as taught below, to the operation of other types of ion transport devices, such as the multiple multipole segment ion transport apparatus 110 illustrated in FIG. 3B, the ion tunnel ion transport apparatus 20 illustrated in FIG. 2A, or the ion funnel ion transport apparatus 120 illustrated in FIG. 2D. In each type of apparatus, a computer or other digital logic controller 52 may control the time and spatial variation of potential profiles by sending control signals to one or more power supplies 54. These control signals cause the one or more power supplies to provide controlled DC electrical potentials either to various potential-profile control electrodes, to certain selected plate or ring electrodes of an ion tunnel or ion funnel apparatus or to any other form of axial-field-generating structure.

FIGS. 4A-4B show details regarding the timing and distribution of applied electrical potentials, V, in accordance with a first method of the present teachings. In this example, FIGS. 4A-4B are plots 71, 72 of electrical potentials across along the length of an apparatus of length L having in ion inlet at position $X_0$, and an ion outlet at position $X_4$. The position $X_0$ is a position at the apparatus inlet which the axial variable, X, is taken as zero. The electrical potential gradients are generated by providing controlled DC electrical potentials to the potential-profile control electrodes 14a, 14b, 14c. As noted in the drawings, the corresponding position along the X-axis at the apparatus outlet may alternatively and more generally be denoted as position $X_L$ (instead of position $X_4$ in the particular example shown). FIGS. 4A and 4B illustrate electrical potential profiles at time points $t_1$ and $t_2$, respectively, where $t_2$ is a later time than $t_1$. Ions enter the apparatus from the left side, typically but not necessarily arriving at the apparatus after exiting some part of atmospheric pressure interface or a high-pressure ion separator such as ion mobility device. After ions are outlet from the apparatus, they continue downstream towards other optical components and, ultimately, a mass spectrometer for analysis and detection.

Positions $X_1$, $X_2$ and $X_3$ along the X-axis are the locations of discontinuities (or otherwise rapid changes) in the direction of axial electric field vectors within the apparatus. These positions may correspond to the positions of internal ion lenses or gates 14a, 14b, 14c, 15, 16a, etc., as shown in FIG. 3A or, alternatively, may correspond to the positions of certain plate electrodes (either plate electrodes 49a or plate electrodes 49b) as shown in FIG. 2D at which there is a reversal in the sign of the rate of change of applied potential as a function of X. Positions $X_0$ and $X_4$ are the locations of inlet electrode 12 and outlet electrode 13 of the apparatus, respectively. Regions 31, 32, 33 and 34 are defined between positions $X_0$ and $X_1$, between positions $X_1$ and $X_2$, between positions $X_2$ and $X_2$ and between positions $X_3$ and $X_4$, respectively. The axial electric field can vary between regions as a result of various potentials or potential profiles applied to electrodes of the apparatus by one or more power supplies 54 under the control of electronic controller 52 (FIGS. 2D-3A).

In the following discussion, it is assumed that positively-charged ions are passed through a transfer apparatus in accordance with the present teachings. Under this assumption, positive ions migrate down potential gradients. The same arguments may be easily adapted to the transfer of negative ions by reversing the polarities of the applied potentials.

In operation in accordance with the first method, the electrical potential profiles are repeatedly cycled between a configuration similar to the profile 71 illustrated in FIG. 4A and the profile 72 illustrated in FIG. 4B. The profile 71 comprises profile segments 61 and 62 and the profile 72 comprises profile segments 63, 64 and 65. The ends of the profile segments correspond to break points in the slope of the full profile to which the segments belong.

Although each profile segment shown in FIGS. 4A-4D is depicted as a single continuous line of constant slope, such depictions are idealized approximations, in most instances. For example, if the profile segment 61 of FIG. 4A represents the electrical potentials of the ring electrodes between ring electrode 90 (at position $X_0$) and ring electrode 93 (at position $X_3$) of the transfer apparatus 20, then an approximation to the linear profile segment may be achieved, in practice, by applying potential $V_0$ to ring electrode 90 and applying potential $V_1$ to ring electrode 93 and allowing a voltage divider circuit to linearly apportion the difference $(V_1 V_0)$ in the applied potentials among the intervening ring electrodes, with a different potential applied to each respective ring electrode. Thus, in this example, the linear approximations depicted in FIG. 4A are only truly applicable in the limit of infinitely thin ring electrodes.

As another example, if the transport apparatus 10 of FIG. 3A is employed, then the potential profiles 171 (FIG. 5A) and 172 (FIG. 5B) are the analogs of the profiles 71 and 72, respectively. Assuming that there are no axially-directed electric fields along the lengths of multipole rods, the long horizontal sections of the profiles 171 and 172 correspond to the positions of the multipole segments 11a, 11b, 11c, 11d. The shorter horizontal sections of the profiles correspond to the positions of electrical-potential-profile control electrodes 14a, 14b, 14c. Sloped sections of the profiles correspond to gaps between components.

In alternative apparatus embodiments, the electrical-potential-profile control electrodes of the transfer apparatus 10 may be eliminated in favor of a larger number of shorter-length multipole segments. In such embodiments, the profiles 171 and 172 will more closely approximate the profiles 71 and 72, respectively, as the rod segments become shorter. In still other alternative apparatus embodiments, the electrical-potential-profile control electrodes of the transfer apparatus 10 may be eliminated and axially-directed electric fields may be provided along the length of each multipole segment by employing any one of a number of known techniques including using tapered or angled rod electrodes, incorporating electrically resistive auxiliary rod electrodes between and parallel to the multipole rod electrodes, incorporating a series of auxiliary vane electrodes along interposed between the multipole rods at various positions along their length, etc. In such other alternative apparatus configurations, the potential profiles may closely approximate the un-broken profile segment lines of the profiles depicted in FIGS. 4A-4D.

The potential profile 171 comprises a generally descending profile segment 161, indicated by a dotted line, between longitudinal positions $X_1$ and $X_3$ and a generally ascending profile segment 162, indicated by a dashed line, between longitudinal positions $X_3$ and $X_4$. The potential profile 172 comprises a generally descending profile segment 163, indicated by a first dotted line, between longitudinal positions $X_0$ and $X_1$, a generally ascending profile segment 164, indicated by a dashed line, between longitudinal positions $X_1$ and $X_2$ and a second generally descending profile segment 165, indicated by another dashed line, between longitudinal positions $X_3$ and $X_4$. As used in this document, the term "generally descending between position $X_a$ and position $X_b$", when applied to a profile segment where $X_b > X_a$, means that the first derivative of the profile segment is not greater than zero at all points at which the first derivative is defined between position $X_a$ and position $X_b$. Similarly, the term "generally ascending between position $X_a$ and position $X_b$", as used in this document when applied to a profile segment where $X_b > X_a$, means that the first derivative of the profile segment is not less than zero at all points at which the first derivative is defined between position $X_a$ and position $X_b$.

Further, as used in this document, a first potential profile is said to be similar to a second potential profile if: (a) the first and second profiles each consist of a same sequence of generally descending and generally ascending profile segments, or (b) the first profile and the mirror image of the second profile each consist of a same sequence of generally descending and generally ascending profile segments. Thus, according to this usage, the profile 72 (FIG. 4B) is similar to the profile 172 (FIG. 5B) because they both consist of a first generally descending profile segment followed by a generally ascending profile segment followed by a generally descending profile segment. The profile 72 would also be similar to a mirror image profile in which generally ascending profile segments replace generally descending profile segments, and vice versa, in order to transport ions of negative polarity along the length of a transfer apparatus from $X=0$ to $X=L$.

Returning to the discussion of FIGS. 4A-4D, the voltages applied to electrodes are such that, at the beginning of each cycle (time $t_1$), the potential profile is similar to the profile 71 shown in FIG. 4A. The profile is maintained for a first time period of duration $\tau_1$. During this first time period, the descending potential profile (profile segment 61 of profile 71) allows ions to travel from the apparatus inlet (at position $X_0$) to position $X_3$ at which there is a reversal of the potential gradient. Additional forward migration of ions is thus prevented at this position and, accordingly, ions are accumulated in the vicinity of the potential well (at potential $V_1$) that is formed by the intersection of the profile segment 61 with the profile segment 62. The number of ions that are accumulated in the potential well during the time duration $\tau_1$ depends, at least in part, on the flux of ions that are delivered to the inlet of the transfer apparatus as well as on the accumulation time duration, $\tau_1$. If the interior of the transfer apparatus is under appreciable gas pressure, then the number of ions that are accumulated may also depend upon the ions' mobility and the potential gradient along profile segment 61.

At a time, $t_2$, the potentials applied to electrodes are changed so that the potential profile is similar to the profile 72 shown in FIG. 4B. In this configuration, the applied potentials at the positions $X_0$ and $X_3$ are elevated above the outlet potential at $X_4$ to provide a downward sloping potential profile segment 65. The reconfiguration of the potential profile requires a switching time of duration, $\delta$. The configuration of the profile segment 65 allows the previously accumulated ions to be transferred out of the apparatus through its outlet. Simultaneously, newly arriving ions migrate along profile segment 63 and arrive at position $X_3$ at which they are accumulated in the vicinity of a new potential well at potential, $V_2$, that is defined by the intersection of profile segment 63 with profile segment 64. The profile configuration shown in FIG. 4B is maintained for a time duration, $\tau_2$, which is chosen such that all of the ions within regions 33 and 34 are able to travel past position $X_4$. The potential profile may be configured such that $\tau_2 < \tau_1$, by either choosing the width of region 34 to be less than the combined widths of regions 31 and 32 and/or by configuring the potential gradient of profile segment 65 to be greater than the potential gradient of profile segment 63. Subsequently, the next cycle begins and the above-noted operations are repeated as stated above, with the exception that the next and all following instances of application of the potential profile 71 depicted in FIG. 4A are maintained for a time duration $\tau_3$ (instead of $\tau_1$) where $\tau_3 \approx \tau_1 - \tau_2$. The shorter accumulation time, $\tau_3$, for iterations after the first is made possible by the fact that ions will have already been accumulated at the potential well at potential, $V_2$, for a period of time, $\tau_2$. By this iterative process, the initial continuous beam is broken into a plurality of packets of ions that are emitted from the outlet of the transfer apparatus to downstream mass spectrometer components. Consecutive packets are separated by gaps of time duration, $2\delta + \tau_3 \approx 2\delta + (\tau_1 - \tau_2)$. If $\tau_2 \approx \tau_1$, then the gaps are relatively small.

Alternatively, if it may be beneficial, under some experimental conditions, to compress the ion population from the originally continuous stream into shorter packets, then additional gating at the outlet of the transfer apparatus (for example, at position $X_4$ as schematically in FIG. 4C) would accomplish this goal. Outlet gate 15 depicted in FIG. 3A is one example of such an outlet gate. The type of gate that is employed may be chosen from a variety of gate types known in the art. One simple option is a simple metal plate with a circular opening. If the potential on the lens is raised, the ions cannot pass through and the gate is "closed". The gate may be closed at or just prior to time $t_2$ and for a duration of time, $\tau_2$, thereafter. The outlet gate may be closed by raising its applied potential to a value, $V_4$, that is greater than the normal outlet potential, $V_0$ of the apparatus (see FIG. 4B). The potential profile thus includes an additional profile segment 66 that causes ions to be accumulated in front of the outlet gate. Subsequently, the potential applied to the gate is lowered to $V_0$ (or possibly lower) for an additional time duration, thereby sending a narrow packet of ions downstream. A sufficient field gradient in the vicinity of the gate is desired to cause the transfer time ($\tau_4$) of the packet of ions out of the apparatus to be of short duration.

The combination of the potential profiles depicted in FIGS. 4A-4C may be employed in a second method for transferring ions in accordance with the present teachings. According to the second method, a first cycle of a sequence of events begins, at a time $t_1$, with the configuring a potential profile across the length of the apparatus in similarity to the profile 71 depicted in FIG. 4A. This profile is maintained for an initial time period of duration, $\tau_1$, during which a first collection of ions, comprising a first packet of ions, are accumulated in the vicinity of a potential well at potential $V_1$ and location $X_3$.

After the initial time period (i.e., at a time, $t_2$), the potential profile is configured in similarity to the profile 73 depicted in FIG. 4C for a second time period of duration, $\tau_2$. While the potential profile is in this second configuration, the ions of the first packet of ions are transferred through regions 33 and 34 and re-accumulated at a potential well at potential $V_0$ at the outlet gate (at or near position $X_4$). This potential well is defined by the discontinuity between profile segment 65 and profile segment 66, the latter of which is the potential of an outlet gate. At the same time, a second collection of ions, comprising a second packet of ions, are accumulated in the vicinity of a potential well at potential $V_2$ and location $X_2$.

Subsequently, at a time, $t_3$, the potential of the outlet gate is dropped to a value that is at or below potential $V_0$, for time period of duration of at least $\tau_3$. This reconfiguration generates a potential profile that has the general form of the profile 72 shown in FIG. 4B. During this third time period, the ions of the first packet of ions are emitted out of the transfer apparatus through its outlet. Also, during this third time period, ions continue to be accumulated in the second packet of ions in the vicinity of the potential well at potential $V_2$ and location $X_2$.

After the expiry of the third period of time, the potential profile is reconfigured so as to once again conform to the general form of the profile 71 depicted in FIG. 4A. This reconfiguration generates a second cycle of the sequence of events described above in accordance with the second method for transferring ions. The second cycle and all subsequent cycles are as described above for the initial sequence events, except that the second and all following instances of application of the potential configuration depicted in FIG. 4A are maintained for a time duration, $\tau_4$, (instead of $\tau_1$) where $\tau_4 \approx \tau_1 - (\tau_2 + \tau_3)$.

In a variant of the second method, the implementation of the potential profile 73 may only occur at certain times during transfer of ions from a transfer apparatus' inlet to its outlet. In such instances, the bunching of ions is performed selectively. For example, in cases in which an ion stream of temporally-varying composition is input the inlet of the transfer apparatus, there may only be a need to bunch ion species of certain compositions that are of analytical interest. At times when such ion species of interest are input (or are expected to be input) to the transfer apparatus, then the axial potential profile across the length of the apparatus will be configured in accordance with a "closed" outlet gate at position $X_4$, in similarity to the profile 73 shown in FIG. 4C. This will cause the ions of interest, if present, to be bunched into a concentrated packet which may then be analyzed by a downstream mass analyzer with greater accuracy and with more sensitive detection than would otherwise be possible. At other times, when no ion species of interest are expected or when detection sensitivity does not present an issue, applied potential profiles similar to profiles 71 and 72 may alternate with one another, without closure of the outlet gate at position $X_4$.

In an alternative apparatus configuration, an ion gate may be provided at a location within the interior of the apparatus. For example, the ion gate 16a that is depicted in FIG. 3A may fulfill such a function. When such an ion gate is configured in its "closed" configuration, as depicted by potential profile 74, ions may be bunched within the ion transfer apparatus by accumulation at a position just in front of the ion gate. The bunched ions may then be transferred, as a spatially discrete packet, through the apparatus to its outlet by subsequently configuring the potential profile similarly to the profile 71 (FIG. 4A) and then configuring the potential profile similarly to the profile 72 (FIG. 4B). During continuous operation, the potential profiles may repeatedly cycle through profiles similar to profiles 74, 71 and 72, in sequence. For the reasons noted above, some of the cycles may omit implementation of a profile similar to profile 74.

The potentials applied to the inlet and outlet electrodes (at $X_0$ and $X_4$, respectively) may be fixed, either relative to one another or in an absolute sense, but are not necessarily so. As stated in the background and summary sections of this document, it is generally desirable to minimize electrical potential gradients between mass spectrometer components and across any individual such component in order to prevent excessively high voltages at either end of an ion pathway. In FIGS. 4A-4D as well as in FIGS. 5A-5B, it is assumed that the applied potentials at the inlet and outlet electrodes are identical. However, the outlet electrode potential may be either higher or lower than the inlet electrode potential. Further the potential applied either to the inlet electrode or to the outlet electrode or to both of these electrodes may vary with time over the course of a mass analysis, depending upon requirements, if any, to regulate the potential difference between the ion transport apparatus and either upstream or downstream components. If one or both of the potentials applied to the inlet and outlet electrodes are caused to vary with time during a mass analysis, then the potentials applied to the internal electrodes may also be changed in simultaneous fashion in order to maintain constant internal potential gradients (e.g., the slopes of the axial potential profile segments 61, 61a, 61b and 62-67).

Figure 6A:
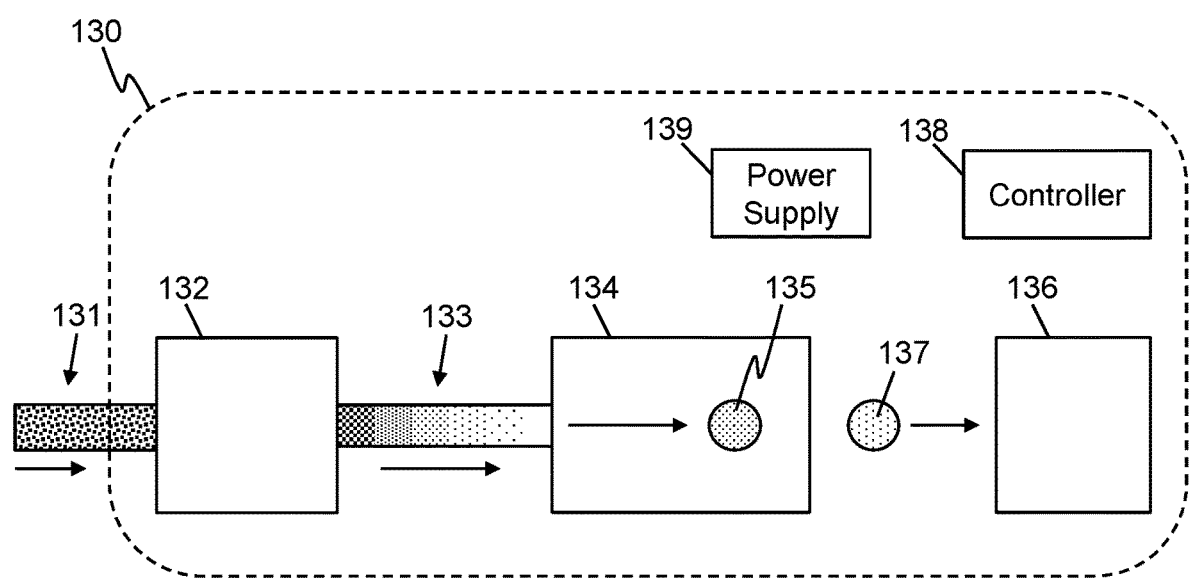
FIG. 6A is a schematic depiction of a first mass spectrometer system, in accordance with the present teachings, that includes an ion mobility separation device and an ion transfer apparatus in accordance with the present teachings.

FIG. 6A is a schematic depiction of an ion mobility and mass spectrometry system 130 in accordance with the present teachings. Various types of ion mobility separation (IMS) devices—including Trapped Ion Mobility Separation (TIMS) devices (e.g., U.S. Pat. Nos. 7,838,826 and 9,683,964) and Field Asymmetric Ion Mobility Separation (FAIMS) devices (e.g., U.S. Pat. Nos. 7,223,967; 10,325,767 and references cited therein)—are frequently employed as "front end" devices that are used to pre-process a stream of ions prior to the introduction of the ions into a mass spectrometer. The inclusion of such ion mobility separation devices between and ion source and a mass analyzer provides a separate mode of ion species separation whose results are not identical to the species separation according to m/z that is provided by the mass analyzer. Thus ion mobility pre-processing can spatially and/or temporally separate interesting ion species from interferent ion species that would otherwise not by mutually resolved by mass analysis alone.

The system 130 includes an ion mobility separation device 132 that receives an ion stream 131 from an ion source (not shown). The ion stream 131 comprises ions of a plurality of ion species, each species having to a respective m/z value and respective ion mobility properties. Ions from the incident ion stream 131 are periodically accumulated into discrete packets, either in an upstream trapping portion of the IMS device 132 or in a separate ion trap (not shown) that is interposed between the ion source and the device 132. Each packet of ions comprises all of the ion species of the original ion stream. Periodically, packets of ions are separately released into a mobility separation region of the IMS device 132. The ions of each ion species of each packet migrate through the IMS device in accordance with the mobility properties of the ion species. Accordingly, the ion species become at least spatially separated from another during migration through the IMS device 132. The ions from each packet thus emerge from an outlet of the IMS device as a new ion stream 133 that comprises a quasi-continuous gradation of ion species (depicted by graded stippled patterning) with the most mobile ions emerging first and the least mobile ions emerging last.

Still with reference to FIG. 6A, the ions of the graded ion stream 133 are inlet to an ion transfer apparatus 134 in accordance with the present teachings, generally under the urging of an imposed electrical potential gradient between the IMS device 132 and the ion transfer apparatus 134. It should be noted that other ion optical components such as ion lenses and ion gates may be disposed between the IMS device and the transfer apparatus as well as elsewhere within the system 130. For clarity and simplicity, such ion optical components are not illustrated in FIG. 6A. Within the ion transfer apparatus 134, the ions of the quasi-continuous graded ion stream 133 are accumulated and bunched into new discrete ion packets, using a method as described above or similar thereto. Each new ion packet contains ion species comprising a restricted range of ion mobility properties and the ion mobility properties vary between packets. One such packet 135 is indicated in transit within the ion transfer apparatus. Another packet 137, comprising ion species having ion mobility properties that are different than the ion mobility properties of the packet 135 (as indicated by the different stipple patterns of the packets), is shown after having exited the ion transport apparatus 134 and in transit to a mass spectrometer or mass analyzer 136.

The conveyance of each packet of ions through the ion transfer apparatus is referred to herein as an individual transfer channel. More than one transfer channel may be active at any one time, with each transfer channel operating in cycles, each cycle comprising accumulation and transfer periods of durations $t_1$, $t_2$, etc. as described above. The accumulation phases could be of variable duration depending on the intensity of the ion signal coming from the IMS separation device. For example, the time durations of ion accumulation and transfers can from tens of microseconds to tens of milliseconds, depending on experimental requirements.

FIG. 6B is a schematic depiction of a second mass spectrometer system 300, in accordance with the present teachings. The mass spectrometer system includes an array 316 of ion transfer apparatuses in accordance with the present teachings, similar to the array of channels described in commonly-owned U.S. Pat. No. 9,607,817, which is incorporated by reference herein in its entirety. FIG. 6C is an expanded view of the array 316 illustrating an example comprising the five ion tunnel apparatuses 20a-20e, each of which may be constructed as shown in FIG. 2A and operated in accordance with the descriptions provided above in this document. Although the array 316 is illustrated as consisting of ion tunnel apparatuses, any of the other types of ion transport apparatuses discussed herein, or variations thereof, may be substituted for any number of or all of the ion tunnel apparatuses.

The system 300 can include an ion mobility cell 302 consisting of a region, such as a substantially rectangular region, with a gas flow 304 moving in a first direction from a gas inlet 306 at one end to a gas outlet 308 at the opposite end. Additionally, an electrical field gradient 310 can be applied in a second direction. In various embodiments, the first direction and the second direction can form an angle of between about 45 degrees and 135 degree, such as between about 70 degrees and about 110 degrees. In particular embodiments, the first direction and the second direction can be orthogonal (at right angles, perpendicular) to one another. A gas pressure within the ion mobility cell 302 can be between about 1 Torr and about 20 Torr, such as between about 3 Torr and about 6 Torr.

An ion source 312 may be located proximal to an ion entrance 314 of the ion mobility cell 302 and the array 316 of ion transfer apparatuses can be located proximal to an array of ion exit orifices 318 of the ion mobility cell. The ion exit orifices 318 can be located opposite the ion entrance 314 in the second direction, and can be offset from the ion entrance 314 and spaced apart from one another in the first direction. Ions 320a through 320e entering the mobility cell 302 from the ion source 312 can be separated into the ion exit orifices 318 and directed into the array 316 of ion transfer apparatuses in accordance with their ion mobility within the mobility cell 302. In various embodiments, the ions 320a through 320e can flow at a substantially the same velocity along the first direction and may move in the second direction according to their collisional cross section. Thus, ions 320e with a larger collisional cross section can move more slowly in the second direction due to a larger number of collisions with the molecules in the gas flow relative to ions with a smaller collisional cross section 320a. Due to the slower movement in the second direction, ions 320e can move further along the first direction during their transit across the mobility cell 302. In this way, ions with successively larger collisional cross section can be sorted into the array 316 of ion transfer apparatuses, such that ions in an ion transfer apparatus have a different range of ion mobilities from ions in an adjacent ion transfer apparatus.

An ion cooling/transfer guide 322 can be located adjacent to the array 316 of ion transfer apparatuses. Ions can be ejected from any one of the of ion transfer apparatuses (e.g., one of the five apparatuses 20a-20e) into the ion cooling/transfer guide 322. The ions may be ejected from only one of the ion transfer apparatuses at any one time or, alternatively, may be ejected simultaneously from more than one of the ion transfer apparatuses at a time. From the ion cooling/transfer guide 322, the ions can be directed to a mass analyzer 324. In various embodiments, the ions may be directed to other processes or components, such as a fragmentation cell (not shown), prior to the mass analyzer.

FIG. 6C is an expanded view of the array 316 of ion transport apparatuses 20a-20e. Each such ion transport apparatus comprises a respective outlet gate electrode (i.e., one of the outlet gate electrodes 13a-13e in the illustrated example). Each outlet gate electrode may be separate, as is illustrated, from its associated ion tunnel. However, in some instances, an outlet gate electrode may be a specific ring or plate electrode of an ion tunnel that is electrically configured to be supplied, at certain controlled times, with a unique electrical potential that can halt the flow of ions and, at certain other time, with an electric potential that permits the flow of ions. Further, one or more of the ion transport apparatuses 20a-20e may comprise an internal gate electrode (not shown in FIGS. 6B-6C) that is disposed between the ion inlet and the ion outlet of the apparatus and that is analogous to the gate electrode 16a of FIG. 3A. Similarly to the outlet gate electrode, the internal gate electrode may either be separate from the ion tunnel structure or, alternatively, may be one of the plate or ring electrodes of the ion tunnel structure.

The ion transport array 316 of the system 300 can separate ions spatially to allow only one or a few types of ions to be directed to the mass analyzer at a time while capturing multiple groups of ions that can be stored in traps and subsequently injected into the mass analyzer. The ejections from the ion transfer apparatuses can allow the mass analyzer to perform mass analysis of an ion packet discharged from a selected one or a selected subset of the ion transport apparatuses 20a-20e while other ions continue to be accumulated and stored in others of the ion transfer apparatuses.

Preferably, the individual ion transport apparatuses of the array 316 may operate in parallel and may be controlled independently of one another. The provision of an array of parallel, independently operated ion transport apparatuses permits the selective injection, into the mass analyzer 324 (through the ion cooling/transfer guide 322), of the trapped ion content of some of the ion transport apparatuses while, at the same time, ions are continuously accumulated in others. The outlet gate electrodes 13a-13e are used to control which packets of ions are released to mass analyzer at any particular time. Further, using the methods of operation described above with reference to FIGS. 4A-4D and 5A-5B, each ion transport apparatus can accumulate and temporarily trap at least one packet of ions therein while, at the same, releasing an earlier accumulated packet of ions to the ion cooling/transfer guide 322. The cycle times of the various ion transfer apparatuses may not all be identical. Different pre-determined cycle times may be used to accumulate different ion species for periods of time that are in inverse relationship to their relative abundances in a sample.

The mass spectrometer system 300 that is depicted in FIG. 6B is but one example of a mass spectrometer system in which an ion transport apparatus in accordance with the present teachings may be disposed along an ion pathway between an ion source and a mass analyzer, wherein the ion pathway is either straight, curved or even tortuous. According to a more-generalized version of the system 300, the mobility cell 302 may be replaced by any device that provides a stream of ions, the composition of which varies with time. For example, the device may consist of a simple ion source, such as an electrospray, thermospray, paper spray, or atmospheric pressure chemical ion source, that receives a stream of material, the chemical composition of which varies in time. The stream of material may be provided, for example, from a chromatograph column or other chemical fractionation apparatus that is coupled to the ion source. Alternatively, the device that provides the ion stream may comprise a mass filter. An ion switch device (not shown) may be interposed between the device that provides the ion stream and the array 316 of ion transport apparatuses. The ion switch may be operated to cause different portions of the ion stream to be directed into and accumulated within different individual ion transport apparatuses.

In yet another generalized version of the system 300, the separator 302 may be based on principles different from ion mobility in gases. For example, the separation may be accomplished based on ion m/z or charge state. The separation mechanism can be due to competition of forces acting on ions which is known in the art to be m/z or z dependent. One such example involves the action of pseudopotential force emerging in non-uniform periodic electric fields as is described, for example, in U.S. Pat. No. 10,510,525. The separation in m/z could be significantly more crude than that of the mass analyzer but it can be useful if ions are separated in fractions either in time or in space. These fractions can be trapped in individual channels and analyzed sequentially without exceeding capacity of the mass analyzer thus increasing selectivity. The analytical duty cycle is enhanced because accumulation in traps is continuous for multiple fractions while only one of them is delivered into the mass analyzer.

The methods and apparatuses described herein allow the mass analysis of multiple separate ion fractions while maintaining a high speed of ion transfer without loss of duty cycle and without need to resort to large voltages at the ends of an optical path. Because of the relationships between the axial potential profile segments, any desired quantity of ions can be transferred to a mass spectrometer without a need for large voltage gradients, controlled gas flow or special dynamic voltage arrangements such as traveling waves. This simplifies the mechanical design and electronics required to drive the apparatus. A certain amount of background gas pressure is required for operation of the ion transfer apparatuses discussed herein. This is because, in the absence of collisional cooling that is facilitated by background gas, it would be difficult to constrain ions with initial kinetic energy to specific locations in the apparatus. Nonetheless, the useable pressure range is wide, e.g., from several mTorr to tens of Torr.

Any patents, patent applications, patent application publications or other literature mentioned herein are hereby incorporated by reference herein in their respective entirety as if fully set forth herein, except that, in the event of any conflict between the incorporated reference and the present specification, the language of the present specification will control.

What is claimed is:

1. A mass spectrometer system comprising:
    an ion source;
    a mass analyzer;
    an ion transport apparatus disposed along an ion pathway between the ion source and the mass analyzer comprising:
        an ion inlet having an inlet electrode thereat and disposed at a longitudinal position $X_0$;
        an ion outlet having an outlet electrode thereat and disposed at a longitudinal position, $X_L$; and
        a plurality of ring or plate electrodes disposed between the inlet and outlet electrodes;
    one or more power supplies electrically coupled to the inlet and outlet electrodes and to the plurality of ring or plate electrodes; and
    a computer or electronic controller electrically coupled to the one or more power supplies and comprising computer-readable instructions operable to cause the one or more power supplies to:
        supply an oscillatory radio-frequency (RF) voltage to each electrode of the plurality of ring or plate electrodes, wherein an RF phase supplied to each electrode is n radians out of phase relative an RF phase supplied to each adjacent electrode; and
        repeatedly performing the steps of:
            (a) providing a first respective direct-current (DC) voltage to each of the plurality of ring or plate electrodes, the plurality of first DC voltages defining a first electrical potential profile that defines an ion-trapping potential well at a longitudinal position $X_k$, where $X_0 < X_k < X_L$; and
            (b) providing a second respective DC voltage to each of the plurality of ring or plate electrodes, the plurality of second DC voltages defining a second electrical potential profile that establishes an axial field at position $X_k$ that is directed to urge ions towards the outlet electrode, the plurality of second DC voltages further defining a trapping potential well at a longitudinal position $X_i$, where $X_0 < X_i < X_k$.

2. A mass spectrometer system as recited in claim 1, wherein the first electrical potential profile comprises:
    a generally descending profile segment between position $X_0$ and position $X_k$ that is operative to urge positively-charged ions away from position $X_0$ and towards position $X_k$; and
    a generally ascending profile segment between position $X_k$ and position, $X_L$ that is operative to urge positively-charged ions away from position $X_L$ and towards position $X_k$.

3. A mass spectrometer system as recited in claim 1, wherein the first electrical potential profile comprises:
    a generally ascending profile segment between position $X_0$ and position $X_k$ that is operative to urge negatively-charged ions away from position $X_0$ and towards position $X_k$; and
    a generally descending profile segment between position $X_k$ and position, $X_L$ that is operative to urge negatively-charged ions away from position $X_L$ and towards position $X_k$.

4. A mass spectrometer system as recited in claim 1, wherein the computer-readable instructions that are operable to cause the one or more power supplies to repeatedly perform the step (a) of providing a first respective DC voltage to each of the plurality of ring or plate electrodes are operable to cause said providing to occur for a time duration, $\tau_1$, that depends on one or both of the group consisting of: a flux of ions delivered to the inlet of the ion transport apparatus and a gas pressure within the ion transport apparatus.

5. A mass spectrometer system as recited in claim 1, wherein the computer-readable instructions that are operable to cause the one or more power supplies to repeatedly perform the step (b) of providing a second respective DC voltage to each of the plurality of ring or plate electrodes are operable to cause said providing to occur for a second time duration, $\tau_2$, wherein $\tau_2 < \tau_1$.

6. A mass spectrometer system as recited in claim 1, wherein a gas pressure within the ion transport apparatus is greater than 1 mTorr.

7. A mass spectrometer system as recited in claim 1, further comprising an ion mobility separation device disposed along the ion pathway between the ion source and the ion transport apparatus.

8. A mass spectrometer system as recited in claim 5,
    wherein the ion outlet comprises a gate electrode; and
    wherein the computer-readable instructions that are operable to cause the one or more power supplies to repeatedly perform the step (b) of providing a second respective DC voltage to each of the plurality of ring or plate electrodes are further operable to maintain the gate electrode in a closed configuration for a first portion of the second time duration, $\tau_2$.

9. A mass spectrometer system as recited in claim 1, further comprising an ion separation apparatus disposed along the ion pathway between the ion source and the ion transport apparatus, wherein the ion separation apparatus is configured to separate ion species in accordance with their respective charge states, z, or in accordance with their respective mass-to-charge ratios, m/z.

10. A mass spectrometer system as recited in claim 9, wherein the ion separation apparatus is configured to separate ion species under the action of pseudopotential forces created by non-uniform periodic electric fields.

11. A mass spectrometer system as recited in claim 1, wherein the ion transport apparatus is one of a plurality of similar ion transport apparatuses that are disposed along the ion pathway between the ion source and the mass analyzer and electrically coupled to the one or more power supplies.

12. A mass spectrometer system comprising:
    an ion source;
    a mass analyzer;
    an ion transport apparatus disposed along an ion pathway between the ion source and the mass analyzer comprising:
        an ion inlet having an inlet electrode thereat and disposed at a longitudinal position $X_0$;
        an ion outlet having an outlet electrode thereat and disposed at a longitudinal position, $X_L$; and
        a plurality of multipole segments disposed between the inlet and outlet electrodes, each multipole segment comprising a respective plurality of mutually parallel rod electrodes;
    one or more power supplies electrically coupled to the inlet and outlet electrodes and to the plurality of rod electrodes of each multipole segment; and
    a computer or electronic controller electrically coupled to the one or more power supplies and comprising computer-readable instructions operable to cause the one or more power supplies to:

supply an oscillatory radio-frequency (RF) voltage to each rod electrode of each multipole segment, wherein, within each multipole segment, an RF phase supplied to each rod electrode of said segment is $\pi$ radians out of phase relative an RF phase supplied to each adjacent rod electrode of said segment; and repeatedly performing the steps of:
(a) providing a first respective direct-current (DC) voltage to all of the rod electrodes of each of the plurality of multipole segments, the plurality of first DC voltages defining a first electrical potential profile that defines an ion-trapping potential well at a longitudinal position $X_k$, where $X_0 < X_k < X_L$; and
(b) providing a second respective DC voltage to all of the rod electrodes of each of the plurality of multipole segments, the plurality of second DC voltages defining a second electrical potential profile that establishes an axial field at position $X_k$ that is directed to urge ions towards the outlet electrode, the plurality of second DC voltages further defining a trapping potential well at a longitudinal position $X_l$, where $X_0 < X_l < X_k$.

13. A mass spectrometer system as recited in claim 12, wherein the first electrical potential profile comprises:
a generally descending profile segment between position $X_0$ and position $X_k$ that is operative to urge positively-charged ions away from position $X_0$ and towards position $X_k$; and
a generally ascending profile segment between position $X_k$ and position, $X_L$ that is operative to urge positively-charged ions away from position $X_L$ and towards position $X_k$.

14. A mass spectrometer system as recited in claim 12, wherein the first electrical potential profile comprises:
a generally ascending profile segment between position $X_0$ and position $X_k$ that is operative to urge negatively-charged ions away from position $X_0$ and towards position $X_k$; and
a generally descending profile segment between position $X_k$ and position, $X_L$ that is operative to urge negatively-charged ions away from position $X_L$ and towards position $X_k$.

15. A mass spectrometer system as recited in claim 12, wherein the computer-readable instructions that are operable to cause the one or more power supplies to repeatedly perform the step (a) of providing a first respective DC voltage to all of the rod electrodes of each of the plurality of multipole segments are operable to cause said providing to occur for a time duration, $\tau_1$, that depends on one or both of the group consisting of: a flux of ions delivered to the inlet of the ion transport apparatus and a gas pressure within the ion transport apparatus.

16. A mass spectrometer system as recited in claim 12, wherein the computer-readable instructions that are operable to cause the one or more power supplies to repeatedly perform the step (b) of providing a second respective DC voltage to all of the rod electrodes of each of the plurality of multipole segments are operable to cause said providing to occur for a second time duration, $\tau_2$, wherein $\tau_2 < \tau_1$.

17. A mass spectrometer system as recited in claim 12, wherein a gas pressure within the ion transport apparatus is greater than 1 mTorr.

18. A mass spectrometer system as recited in claim 12, further comprising an ion mobility separation device disposed along the ion pathway between the ion source and the ion transport apparatus.

19. A mass spectrometer system as recited in claim 12, wherein the ion transport apparatus is one of a plurality of similar ion transport apparatuses that are disposed along the ion pathway between the ion source and the mass analyzer and electrically coupled to the one or more power supplies.

20. A mass spectrometer system as recited in claim 12, further comprising an ion separation apparatus disposed along the ion pathway between the ion source and the ion transport apparatus, wherein the ion separation apparatus is configured to separate ion species in accordance with their respective charge states, z, or in accordance with their respective mass-to-charge ratios, m/z.

21. A mass spectrometer system as recited in claim 20, wherein the ion separation apparatus is configured to separate ion species under the action of pseudopotential forces created by non-uniform periodic electric fields.

22. A method of transporting ions within a mass spectrometer comprising:
receiving a continuous stream of positively charged ions at an inlet end of an ion transport device, the ion transport device further comprising an outlet end;
accumulating a first portion of the stream of ions at a first electrical potential well at a first position within the ion transport device between the inlet end and the outlet end, the accumulating driven by an electrical potential difference between the first position and the inlet end;
creating a generally descending potential profile within the ion transport apparatus between a second position and the outlet end and, simultaneously, creating a second potential well at a third position within the ion transport apparatus, the second position disposed between the first position and the inlet end, the third position disposed between the second position and the inlet end; and
transporting the accumulated first portion of the ion stream from the first position to the outlet end under the impetus of the generally descending potential profile and, simultaneously, accumulating a second portion of the ion stream at the second potential well, the accumulation of the second portion of the ion stream driven by an electrical potential difference between the third position and the inlet end.

23. A method of transporting ions within a mass spectrometer as recited in claim 22, wherein an inlet electrical potential at the inlet end and an outlet electrical potential at the outlet end are both constant and wherein the outlet electrical potential is greater than the inlet electrical potential.

24. A method of transporting ions within a mass spectrometer as recited in claim 22, wherein the first electrical potential well is maintained for a time duration, Ti, that depends on one or both of the group consisting of: a flux of ions delivered to the inlet of the ion transport apparatus and a gas pressure within the ion transport apparatus.

25. A method of transporting ions within a mass spectrometer as recited in claim 22, wherein the step of transporting the accumulated first portion of the ion stream from the first position to the outlet includes:
bunching the first portion of the ion stream into a packet at an outlet gate electrode maintained in a closed configuration that prevents ions from passing through the outlet gate; and reconfiguring the outlet gate into an open position that permits the packet of ions to exit the ion transport device through its outlet end.

26. A method of transporting ions within a mass spectrometer as recited in claim 22, further comprising:

establishing a third electrical potential well at the first position and continuing to accumulate the second portion of the stream of ions at the third potential well, the accumulating driven by an electrical potential difference between the first position and the inlet end;

creating a second generally descending potential profile between the second position and the outlet end and, simultaneously, creating a fourth potential well at the third position; and transporting the accumulated second portion of the ion stream from the first position to the outlet end under the impetus of the second generally descending potential profile and, simultaneously, accumulating a third portion of the ion stream at the fourth potential well, the accumulation of the third portion of the ion stream driven by an electrical potential difference between the third position and the inlet end.

27. A method of transporting ions within a mass spectrometer as recited in claim 22, wherein the receiving of the continuous stream of positively charged ions comprised receiving a continuous stream of ions outlet from an ion mobility separation device.

\* \* \* \* \*

UNITED STATES PATENT AND TRADEMARK OFFICE
CERTIFICATE OF CORRECTION

PATENT NO. : 11,600,480 B2
APPLICATION NO. : 17/028204
DATED : March 7, 2023
INVENTOR(S) : Pablo Nieto Ramos et al.

It is certified that error appears in the above-identified patent and that said Letters Patent is hereby corrected as shown below:

In the Claims

In Column 19, Claim 1, Line 27, delete "n radians" and insert -- $\pi$ radians --, therefor.

In Column 22, Claim 24, Line 56, delete "Ti," and insert -- $\tau_1$, --, therefor.

Signed and Sealed this
Eleventh Day of April, 2023

Katherine Kelly Vidal
*Director of the United States Patent and Trademark Office*